(12) United States Patent
Damerow et al.

(10) Patent No.: US 12,540,160 B2
(45) Date of Patent: Feb. 3, 2026

(54) METHODS FOR THE PURIFICATION OF REFOLDED Fc-PEPTIDE FUSION PROTEIN

(71) Applicant: RICHTER GEDEON NYRT., Budapest (HU)

(72) Inventors: Sebastian Damerow, Noderstadt (DE); Elisa Mir, Hamburg (DE); László Zoltán Baranyai, Budapest (HU); Zoltán Sütö, Fehérgyarmat (HU)

(73) Assignee: Richter Gedeon NYRT., Budapest (HU)

( * ) Notice: Subject to any disclaimer, the term of this patent is extended or adjusted under 35 U.S.C. 154(b) by 359 days.

(21) Appl. No.: 18/039,688

(22) PCT Filed: Dec. 17, 2021

(86) PCT No.: PCT/EP2021/086384
§ 371 (c)(1),
(2) Date: May 31, 2023

(87) PCT Pub. No.: WO2022/129460
PCT Pub. Date: Jun. 23, 2022

(65) Prior Publication Data
US 2024/0101598 A1    Mar. 28, 2024

(30) Foreign Application Priority Data

Dec. 18, 2020 (EP) ................................. 20215581

(51) Int. Cl.
| | | |
|---|---|---|
| C07K 1/00 | (2006.01) | |
| C07K 1/36 | (2006.01) | |
| C07K 14/52 | (2006.01) | |

(52) U.S. Cl.
CPC .............. *C07K 1/36* (2013.01); *C07K 14/524* (2013.01); *C07K 2319/30* (2013.01)

(58) Field of Classification Search
CPC ....................................................... C07K 1/36
See application file for complete search history.

(56) References Cited

U.S. PATENT DOCUMENTS

| | | | | |
|---|---|---|---|---|
| 2008/0213215 A1* | 9/2008 | Krishnan | ................... | F26B 5/06 514/12.4 |
| 2010/0331526 A1* | 12/2010 | Shultz | ...................... | C07K 1/18 530/413 |
| 2017/0058019 A1* | 3/2017 | Felföldi | ................... | B01J 41/20 |

FOREIGN PATENT DOCUMENTS

| | | |
|---|---|---|
| CA | 3026518 A1 | 12/2017 |
| EP | 0219874 | 4/1987 |
| EP | 3436473 | 2/2019 |
| WO | WO0002901 | 1/2000 |
| WO | WO0024770 | 5/2000 |
| WO | WO0024782 | 5/2000 |
| WO | WO2010151688 | 12/2010 |
| WO | WO2011005488 | 1/2011 |
| WO | WO2017168296 | 10/2017 |
| WO | WO2020200980 | 10/2020 |

OTHER PUBLICATIONS

Cwirla et al., (1997) "Peptide Agonist of the Thrombopoietin Receptor as Potent as the Natural Cytokine", Science, 276:1696-1699.
Dietrich et al., (2003) "Industrial Protein Folding", BIOforum Europe GIT Verlag GmbH & Co. KG Darmstadt, pp. 1-6.
Fayaz et al., (2016) "Expression, purification and biological activity assesment of romiplostim biosimilar peptibody", Daru, 24(18):1-5.
Fahrner et al., (2001) "Industrial Purification of Pharmaceutical Antibodies: Development, Operation, and Validation of Chromatography Processes", Biotechnol. Genet. Eng. Rev., 18(1):301-327.
Gagnon (1996) "Purification Tolls for Monoclonal Antibodies", Validated Biosystems, pp. 1-3.
GE Healthcare (2007) "Purification and renaturation of recombinant proteins produced in *Escherichia coli* as inclusion bodies", Application Note 18-1112-33, pp. 1-5.
Li et al., (2001) "Thrombocytopenia caused by the development of antibodies to thrombopoietin", Blood, 98(12):3241-3248.
Linderholm and Chamow (2014) "Immunoglobulin Fc-Fusion Protein", BioProcess International, 12(9):30-35.
Liu et al., (2010) "Recovery and purification process development for monoclonal antibody production", mAbs 2(5):480-499.
Marston (1986) "The purification of eukaryotic polypeptides synthesized in *Escherichia col*", Biochem. J., 240: 1-12.
Pyzik et al., (2015) "FcRn: The Architect Behind the Immune and Nonimmune Functions of IgG and Albumin", J. Immunol, 194(10):4595-4603.
Rudolph (1990) "Renaturation of recombinant, disulfide-bonded proteins from inclusion bodies", In Modern Methods in Protein-and Nucleic Acid Research, pp. 149-171.
Rudolph and Lilie (1996) "In vitro folding of inclusion body proteins", FASEB J, 10:49-56.
Shimamoto et al., (2012) "Peptibodies: a flexible alternative format to antibodies", mABs, 4(5):586-591.

(Continued)

Primary Examiner — Yong D Pak
(74) Attorney, Agent, or Firm — Mandar A. Joshi; Bozicevic, Field & Francis LLP

(57) ABSTRACT

The present invention relates to new methods for the purification of Fc-peptide fusion protein (peptibodies) derived from inclusion bodies after prokaryotic expression. In particular, it relates to chromatographic methods of the fusion peptides after refolding and dimerization comprising affinity capture, intermediate and polishing chromatographies. These methods facilitate the decrease of product-related impurities, such as sulfide variants or charge variants of the Fc-peptide fusion proteins in the final product. In addition, the present invention relates to specific conditions and selected buffers avoiding aggregation, precipitation, and degradation of the Fc-peptide fusion proteins. Finally, the methods of the present invention result in a formulated pharmaceutical composition or a pre-stage pharmaceutical composition containing an Fc-peptide fusion protein of high purity.

25 Claims, 5 Drawing Sheets

Specification includes a Sequence Listing.

(56) References Cited

OTHER PUBLICATIONS

Shukla et al., (2008) "Demonstation of robust host cell protein clearance in biopharmaceutical downstream processes", Biotechnol. Prog., 24:615-622.
Zhang et al., (2020) "Large-scale production, purification, and function of a tumor multi-epitope vaccine: Peptibody with bFGF/VEGFA", Eng Life Sci., 20:422-436.

* cited by examiner

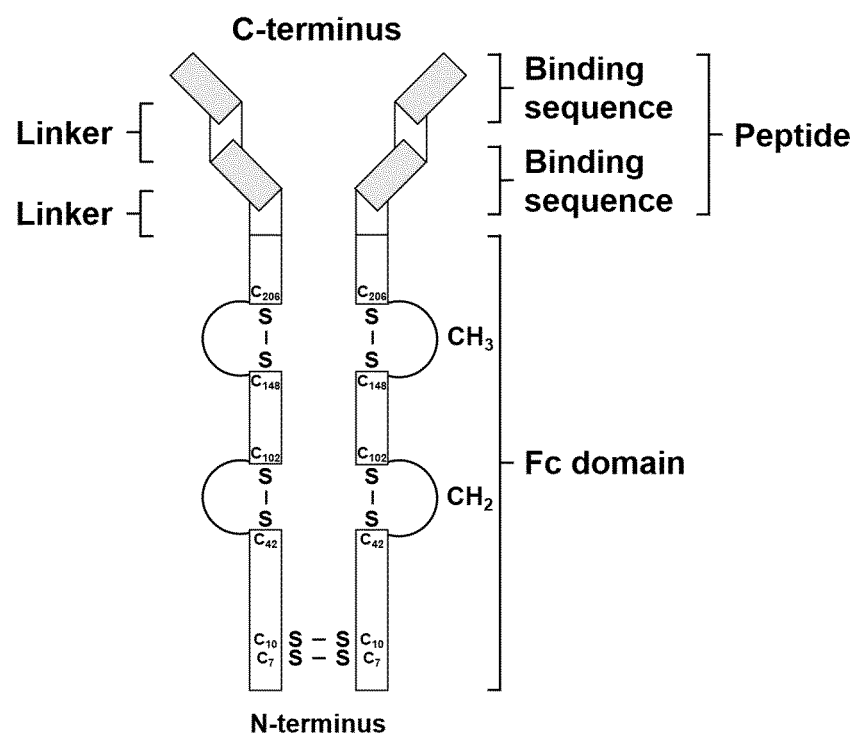
Figure 1: Structure of a peptibody.

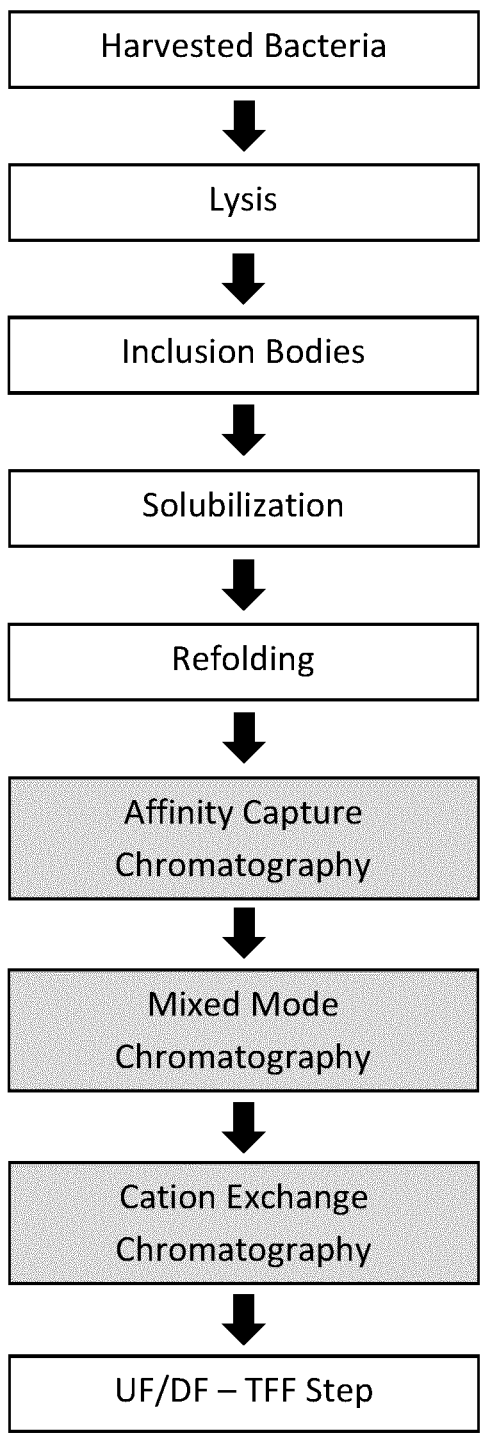
Figure 2: Downstream process scheme of an Fc-peptide fusion protein expressed in inclusion bodies of bacteria.

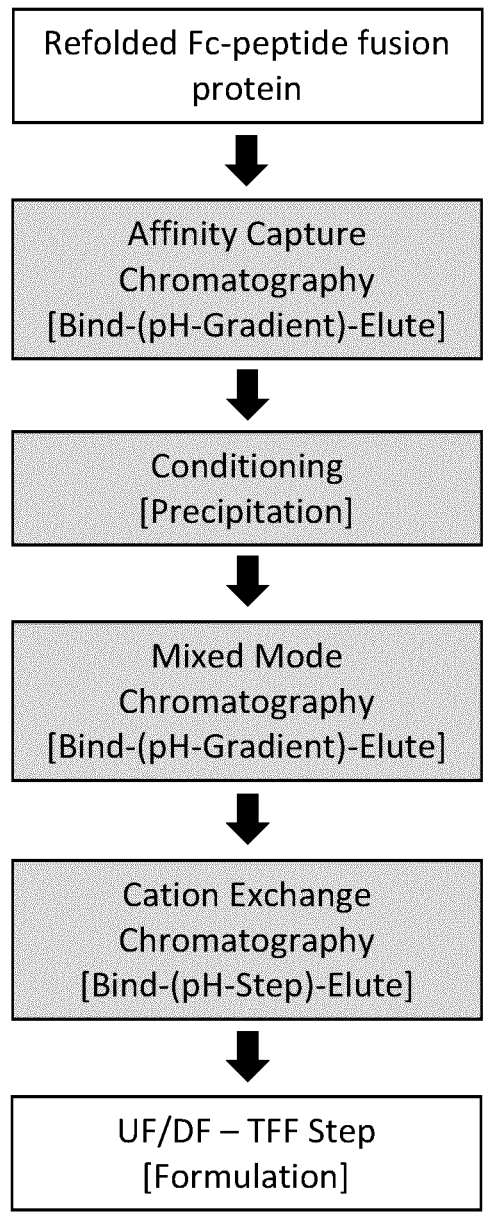
Figure 3: Purification scheme of a refolded Fc-peptide fusion protein derived from inclusion bodies of bacteria.

Figure 4: Purification scheme of a refolded Fc-peptide fusion protein, selected chromatographic media, and preparation of final pharmaceutical composition.
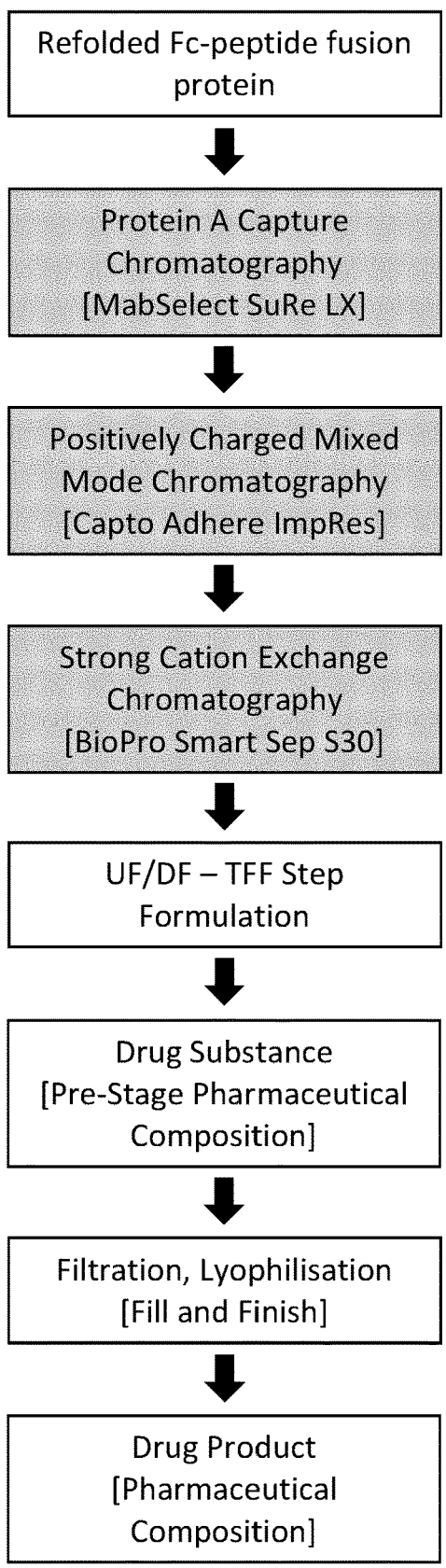

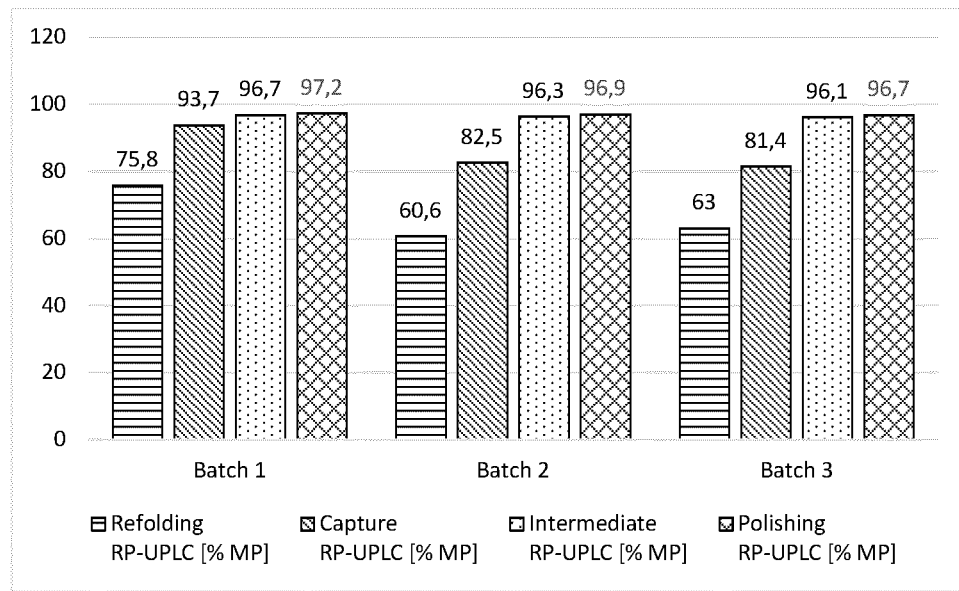
Figure 5: Relative purity of romiplostim over the whole purification process.

METHODS FOR THE PURIFICATION OF REFOLDED Fc-PEPTIDE FUSION PROTEIN

FIELD OF THE INVENTION

The present invention relates to methods of purifying Fc-peptide fusion proteins expressed in microorganisms using a sequence of chromatographies. These methods comprise affinity chromatography, mixed-mode chromatography, and cation exchange chromatography, thereby providing the Fc-peptide fusion proteins in pharmaceutical grade purity, substantially free of process-related impurities and with very low levels of product-related impurities, which result from cell disruption, solubilisation out of inclusion bodies, and from subsequent refolding.

BACKGROUND OF THE INVENTION

The use of therapeutic peptides is an attractive pharmaceutical approach. Therapeutic peptides often exhibit a potent biologic activity and a high specificity, as well as a good tissue penetration because of their small size. However, many biologically active peptides have a limited half-life due to their rapid renal clearance, which limits their exposure in the target tissue and their pharmacological effects. In contrast, immunoglobulin (IgG) exhibits a prolonged half-life due to their large size and to the pH-dependent binding of the neonatal Fc-receptor (FcRn) that salvages the IgG from degradation (Pyzik et al. 2015).

Fc-peptide fusion proteins (peptibodies) combine the biologic activity of peptides with the stability of monoclonal antibodies. To engineer these Fc-peptide fusion protein an active high-affinity peptide is fused in frame with the Fc domain of an IgG (Shimamoto et al. 2012). The integration of the Fc domain of IgG intends to prolong the half-life through FcRn protection. The high-affinity peptide represents the biologically active region and is engineered to maximize its activity. The peptide sequences are isolated from phage libraries or known sequences and integrated by recombinant cloning techniques. Improvement of the affinity of the peptide for its target can be achieved by duplication of its sequence, alteration of the peptide sequence or addition of specifically designed flanking spacers, residues, or linker sequences. The orientation of the peptide sequence can alter its activity, e.g., peptides are more active when fused to the carboxy terminus of the Fc domain instead to the amino terminus (Shimamoto et al. 2012). Homodimerization of two Fc molecules generates a minimum of two peptides in one peptibody, increasing the avidity for its target.

The prototype peptibody, romiplostim (Nplate®) was approved for the treatment of immune thrombocytopenic purpura (ITP) by the United States Food and Drug Administration (FDA) in 2008 and by the European Medicines Agency (EMA) in 2009, respectively. Structurally, romiplostim is composed of a peptide mimetic of thrombopoietin (TPO) fused with the Fc domain of IgG1. Endogenous TPO is a glycoprotein hormone produced in the liver and binding of TPO to its receptor c-Mlp triggers a signalling cascade that regulates the differentiation and proliferation of megakaryocytes in the bone marrow with a concurrent increase of platelets. Cloning and characterization of TPO in the mid-1990s lead to the generation of a full-length, glycosylated recombinant protein identical to endogenous TPO (rhTPO), and a non-glycosylated, pegylated, truncated recombinant protein (PEG-rHuMGDF). The finding that PEG-rHuMGDF induced cross-reacting antibodies, which neutralized endogenous TPO (Li et al. 2001) lead to the development of romiplostim. The 14-amino acid peptide component of romiplostim was identified from screening of recombinant phage libraries of random peptides that stimulate TPO-dependent cell lines (Cwirla et al. 1997). The affinity of the peptide was optimized by mutagenesis and addition of flanking linkers. The peptide of romiplostim shares no sequence homology with endogenous TPO minimizing the development of cross-reacting antibodies. Romiplostim is a homodimer composed of two identical single chain subunits, each subunit consists of two tandem repeats of the TPO-binding peptide sequence separated by an eight-glycine linker and fused to the carboxy terminus of a human IgG1 Fc by another five-glycine linker. Romiplostim is produced by recombinant DNA technology in *E. coli*. By mimicking the function of endogenous TPO romiplostim acts as a TPO receptor agonist that activates intracellular transcriptional pathways via the TPO receptor c-Mlp to increase the production of platelets.

Overexpression of heterologous recombinant polypeptides in transformed microorganisms often results in the formation of so-called inclusion bodies (IBs), which contain the recombinant protein in non-native form. These inclusion bodies are highly refractile, amorphous aggregates and the polypeptides therein are generally unfolded, reduced, inactive, and at least partially insoluble in common aqueous buffers. Processes for obtaining recombinant proteins from inclusion bodies are described in the art and generally comprise lysis and disruption of the cells followed by centrifugation. The pellet comprising a large proportion of inclusion bodies is usually washed with detergents to remove lipid membranes, lipopolysaccharides (LPS), other cell debris, and other contaminants. The scientific literature provides many methods to isolate and purify inclusion bodies and to solubilize and refold the recombinant protein afterwards into its native state. (The terms 'refolding' and 'renaturation' are synonymously used herein). Different strategies can be applied to solubilise the recombinant protein. Besides ionic or non-ionic detergents, such as sodium dodecyl sulfate (SDS) or N-laurylsarcosin (sarkosyl), chaotropic reagents, such as guanidine hydrochloride (GuHCl) or urea, are used to solubilise a protein of interest. Often the solubilisation is performed under alkaline conditions (pH 8 to 12.5) in the presence of reducing agents, such as dithiothreitol (DTT), dithioerythrol (DTE) or2-mercaptoethanol (ME) (Marston 1986, Rudolph 1990, Rudolph and Lilie 1996, Dietrich et al. 2003). Typically, the solubilised protein is at first fully reduced and inactive, and then undergoes refolding prior to the chromatographic purification. For example, EP0219874 discloses generic methods for refolding of recombinant proteins from *E. coli* inclusion bodies. For the solubilisation the chaotropic agents GuHCl and arginine were used at high pH. EP0219874 describes the formation of disulfide bridges under redox conditions provided by GSH/GSSG. Rudolph (1990) describes the following sequence of steps: a) the use of GuHCl or urea for solubilisation at pH 8-9 under reductive conditions (DTT, DTE or 2-ME), b) removal of reagents by dialysis or gel chromatography (Sephadex G-25™) and c) disulfide formation (=refolding) by oxido-shuffling systems or by reversal chemical modification of protein thiols, both based on the effect of added GSH/GSSG. Rudolph and Lilie (1996) emphasizes on additives used during refolding which can affect the solubility and stability of the unfolded protein, the folding intermediates, and the native folded protein. The authors suggest a generic basic protocol for solubilisation and refolding: a) Solubilisation with 6 M GuHCl and 100 mM DTT at pH 8, b) reducing agents are removed by dialysis and pH is adjusted to 4.5 and c) folding is performed by high dilution (1:200) in a buffer with EDTA and GSH/GSSG at pH 7.5 to 8.5. Dietrich et al. (2003) describes the solubilisation of proteins from *E. coli* inclusion bodies with 6 M GuHCI under reductive conditions (DTE). The refolding incubation was performed at pH 9 in 1 M arginine in the presence of GSH/GSSG. Final purification was performed using hydrophobic interaction chromatography (HIC) followed by cation exchange chromatography (CEX) using SP Sepharose™. An application note available from GE Healthcare 2007 (Application Note 18-1112-33, 1-4) also reviewed general protocols. Solubilisation is recommended with 8 M urea or 6 M GuHCI. Refolding is described as slow dialysis or dilution near neutral pH. Alternatively, a chromatographic step can be used for refolding. The suggested chromatographic methods comprise size exclusion chromatography (SEC), ion exchange chromatography (IEX), and hydrophobic interaction chromatography (HIC) which is suggested instead of dialysis or dilution. W00002901 describes a general method for refolding by applying high pressure within a refolding tank. Optionally, chaotropic agents and/or redox compounds (DTT/GSSG) are present in the refolding buffers. WO2011005488 refers to the refolding of Fc-fusion proteins with a buffer containing a denaturant, such as urea, dimethyl urea or other chaotropes, an aggregation suppressor, such as arginine, a protein stabilizer, such as glycerol or sucrose, and a redox component, such as cysteine or cystamine. W02010151688 links refolding and purification of Fc-fusion proteins. The Fc-containing protein is directly purified from the refold mixture which comprises glycerol, guanidine, urea, and arginine without the need of diluting the refold buffer prior to application to a separation matrix, such as Protein A affinity chromatography and cation exchange chromatography, respectively.

In case of peptibodies the refolding of the reduced monomeric polypeptides requires an oxidation of the dimer. The Fc part of the peptibody, usually corresponding to the Fc part of human IgG1, consists of two chains linked by two disulfide bridges. In addition, the CH2 and CH3 domains of the Fc part each possess two intrachain disulfide bridges on each chain. Altogether, the Fc moiety comprises twelve cysteines. A successful refolding of a peptibody would result in a dimeric Fc-moiety having six disulfides in the right position, two interchain and four intrachain bridges (see FIG. 1). It is apparent, that the refolding process will bear also several incomplete, misfolded, and undesired species, like sulfide variants, i.e. variants with unpaired cysteines, trisulfides, and mismatched sulfide variants with disulfide bridges in a wrong configuration. These product-related impurities have to be removed during the subsequent purification, along with other impurities such as process-related impurities, in order to produce a safe and highly pure pharmaceutical product for human use.

The selection of efficient and economic downstream sequences for purification of polypeptides produced by recombinant DNA technology is a crucial step in the development of every new biopharmaceutical intended for therapeutic use. The generally complex composition of the refold solution for recombinant polypeptides expressed in bacterial inclusion bodies sets high demands on the capture chromatography and on the subsequent polishing chromatographies. The entire downstream process has to: (i) manage a high mass of protein, (ii) efficiently remove increased process- and product-related impurities to levels below defined acceptance criteria, (iii) maintain economic yields, and (iv) assure sufficient quality of the protein drug. Usually, the downstream process accounts for a major part of the total manufacturing costs of a therapeutic recombinant protein.

The refolded recombinant proteins derived from inclusion bodies of microorganisms are typically associated with a high load of process- and product-related impurities. Process-related impurities are impurities that derive from either the upstream or downstream parts of the manufacturing process and comprise host cell proteins (HCP), host cell DNA (HCDNA), endotoxins, and various leachates from process materials. Product-related impurities, such as sulfide variants (reduced forms, free cysteine, disulfide mismatches), charged variants, aggregates, oxidised species (methionine, tryptophane), deamidated species (asparagine), carbamoylated species, truncated species (C- and N-terminal), monomers, and other undesired product variants are difficult to analyse. Their removal is a big challenge for the downstream process. The presence of any of these impurities is a potential health risk for patients, and hence their depletion in the final product is a safety requirement. Only very low residual amounts can be tolerated.

The classical procedure for purifying refolded inclusion body-derived polypeptides follows the sequence of capture-intermediate-polishing chromatographies, accompanied by filtrations and concentration or dialysis steps at various positions of the downstream sequence.

One of the most frequent capture steps used for purification of Fc-bearing molecules is affinity chromatography with Protein A or Protein G in which the immunoglobulin has to be captured from a sample comprising the Fc-protein together with impurities. This type of capture offers exceptional selectivity for Fc-bearing proteins, thereby removing most contaminants resulting in purities as high as 95% in a single step (Gagnon 1996). The Fc-protein is separated from the impurities because of the selective binding of the Fc moiety to the affinity ligands of the capture chromatography resin, while the impurities do not bind to the resin and are thus obtained in the flow-through, whereas the Fc-protein is obtained in the eluate. This efficient purification step is one of the advantages, which characterise the Fc-fusion system.

Typically, a downstream purification process for an Fc-fusion protein consists of three chromatography steps starting with a Protein A capture step and followed by two polishing chromatography steps for trace impurity removal. This general process outline is concordant with a common platform for monoclonal antibodies and Fc-fusion proteins across the biopharmaceutical industry (Fahrner et al. 2001, Shukla et al. 2008). The polishing chromatography steps serve to reduce process-related and product-related impurities. In case of a bacterial host system utilized for production of Fc-fused small- or mid-sized peptides, the recombinantly expressed polypeptides are not glycosylated. The normally present N-linked oligosaccharide of the Fc domain is absent, resulting in limited solubility, a tendency to aggregate and to precipitate, and sets further high demands on the selection of appropriate chromatographies and their conditions. Polishing chromatographies, which are commonly used for antibody and Fc-fusion protein purification, are usually selected from anion- and cation exchange chromatography, hydrophobic interaction chromatography, mixed-mode chromatography, hydroxyapatite chromatography, hydrophobic charge induction chromatography, and immobilised metal affinity chromatography (Gagnon 1996, Liu 2010).

There are various examples in the literature for purification of the Fc-peptide fusion protein romiplostim. For example, Linderholm and Chamow (2014) refer to a typical purification scheme of Fc- peptide fusion protein which includes centrifugation/filtration to yield a clarified supernatant followed by protein A chromatography before polishing with additional chromatography steps. Challenges in the purification of Fc-peptide fusion protein include the optimization of the elution conditions to maintain the biological activity, reducing protein aggregation, and identifying polishing techniques that enable high purity and yield. Zhang et al. (2020) describe a purification procedure of cation exchange and hydrophobic chromatography to first reduced endogenous host cell proteins prior to Protein A chromatography. W00024770 and W00024782 describe the purification of an Fc-TPO mimetic peptide (Fc-TMP-TMP). After solubilization of the inclusion bodies with guanidine, Tris, and DTT, the mixture was diluted with urea, Tris, arginine, and cysteine. During stirring of the mixture, the Fc-TMP-TMP monomer subunits dimerize to form a disulfide-linked compound. Afterwards the acid precipitated Fc-TPO mimetic peptide was purified on cation exchange chromatography in binding mode. Fayaz et al. (2016) describes the construction of romiplostim, the expression in E. coli, and the analysis. After the process of lysis, separation, denaturation, and solubilization, the peptibodies were refolded and purified by Protein A Sepharose™ affinity chromatography. WO2017168296 discloses the purification of an Fc-fusion protein by using a series of steps comprising Protein A as capture step, followed by anion exchange chromatography and hydrophobic interaction chromatography, prior to cation exchange chromatography as final polishing step.

SUMMARY OF THE INVENTION

The present invention relates to new methods for the purification of recombinant Fc-peptide fusion proteins extracted from inclusion bodies and refolded into biologically active, homodimeric molecules. The methods comprise a sequence of chromatographic methods comprising affinity capture, intermediate, and polishing chromatographies.

The key problem of purifying refolded Fc-peptide fusion proteins turned out to be the presence of sulfide variants, which have similar physicochemical properties and similar chromatographic behaviour. Since in a final pharmaceutical product these product-related impurities are tolerated only at very low levels they have to be depleted during the purification process. In particular during the refolding process high amounts of sulfide variants form. Therefore, the present invention developed methods, which overcome co-purification of the sulfide variants and other impurities. In particular, the invention provides methods for the purification of recombinant Fc-peptide fusion proteins from impurities without significant loss of the recombinant Fc-peptide fusion protein, i.e. during the purification process a high percentage of the correctly folded recombinant Fc-peptide fusion protein is recovered.

To achieve the required high purity of the recombinant protein intended for therapeutic use two or more chromatographic polishing steps follow the affinity capture chromatography.

The methods of the invention include specific conditions and selected buffers to avoid undesired secondary modification, such as aggregation, precipitation, oxidation, deamidation, truncation or other types of degradation of the Fc-peptide fusion proteins. The methods target pharmaceutical grade quality by decreasing product-related impurities, such as sulfide variants or charged variants of the Fc-peptide fusion proteins in the final product, which is a formulated pharmaceutical composition or a pre-stage pharmaceutical composition containing an Fc-peptide fusion protein of high purity. The formulation and the desired Fc-peptide fusion protein concentration is enabled by a final diafiltration/ultrafiltration step, which is a part of the invented purification sequence, too.

In one aspect, the invention provides a method for purification of a refolded Fc-peptide fusion protein from a composition comprising the Fc-peptide fusion protein and at least one impurity, the method comprising the following steps in the following order:
   a) performing an affinity capture chromatography;
   b) performing a mixed-mode chromatography;
   c) performing a cation exchange chromatography; and
   d) performing an ultrafiltration/diafiltration;
   wherein the Fc-peptide fusion protein is derived from inclusion bodies of microorganisms; and wherein the at least one impurity is a sulfide variant of the Fc-peptide fusion protein; and
   wherein the chromatographies a), b), and c) are performed in bind-elute mode, optionally with one or more washing steps.

The Fc-peptide fusion protein can be expressed in microorganisms, preferably in bacteria, more preferably in E. coli.

In one embodiment, the refolded Fc-peptide fusion protein is a non-glycosylated, dimeric Fc-peptide fusion protein. Since the Fc-peptide fusion protein is devoid of the natural glycosylation pattern, its structural integrity and solubility is reduced compared to glycosylated Fc-peptide fusion proteins. Hence the method of the invention in particular overcomes the problems of purification of non-glycosylated Fc-peptide fusion proteins by a specific purification method which allows to recover the Fc-peptide fusion protein in reasonable yields while removing impurities, in particular sulfide variants of the Fc-peptide fusion protein.

The fused Fc domain can be derived from human immunoglobulin, preferably from IgG, more preferably from IgG1.

The peptide sequence can be a receptor agonist, preferably a thrombopoietin mimetic. Thus, in a preferred embodiment, the Fc-peptide fusion protein is romiplostim. Romiplostim is a homodimer composed of two identical single chain subunits. The amino acid sequence of romiplostim, in particular a monomer chain of romiplostim is set out in SEQ ID NO: 1: MDKTHTCPPCPA-PELLGGPSVFLFPPKPKDTLMISRTPE-VTCVVVDVSHEDPEVKFNVVYVDGVE VHNAKTKPREEQYN-STYRVVSVLTVLHQDWLNGKEYKCKVSNKALPA-PIEKTISKAKGQPREPQ VYTLPPSRDELTKNQVSLT-CLVKGFYPSDIAVEWESNGQPENNYKTTPPVLDSDG-SFFLYSKLTV DKSRWQQGNVFSCSVMHEALHN-HYTQKSLSLSPGKGGGGGIEGPTLRQW-LAARAGGGGGG GIEGPTLRQWLAARA Preferably, the peptides are fused at the C-terminus of human IgG1-Fc.

The length of the peptide fused to the monomeric Fc chain can range from 15 to 100 amino acids, preferably from 25 to 70 amino acids, most preferably from 30 to 50 amino acids.

Specific embodiments refer to a method for purifying an Fc-peptide fusion protein after its expression in inclusion bodies of microorganisms, its solubilization and refolding, the method comprising the following steps in the following order:

a) performing a Protein A capture chromatography, wherein the Fc-peptide fusion protein is eluted with a decreasing pH gradient;
b) performing a mixed-mode chromatography, wherein the Fc-peptide fusion protein is eluted with a decreasing pH gradient from a positively charged mixed-mode chromatography medium;
c) performing a cation exchange chromatography; wherein the Fc-peptide fusion protein is eluted from a strong cation exchange medium, preferably with charged groups —R—$SO_3^-$ bound to a hydrophilic polymer matrix;
d) performing an ultrafiltration/diafiltration.

Protein A elution with a decreasing pH gradient offers the possibility for a selective pooling of tightly bound Fc-peptide fusion protein and thereby resulting in a reduction of variants which have less tight binding properties. Surprisingly, by using a decreasing pH gradient mode of chromatography the dimers of the Fc-peptide fusion proteins are separated from most of the Fc-peptide fusion protein monomers.

Alternatively, instead of a pH gradient, a stepwise washing of Protein A with lowered pH buffers can be used. The pH of the wash buffers has to be selected in an optimum way to elute monomers while intact dimers remain bound.

It has to be mentioned that the introduction of a Protein A capture step results in contamination of the Fc-peptide fusion protein with leached ligand, i.e. Protein A. By selection of a more robust recombinant Protein A resin, such as MabSelect SuRe, leaching is rather low, i.e. 10-15 ppm. Nevertheless, the subsequent chromatographies have to remove the leached Protein A. The selected type and mode of the intermediate mixed-mode chromatography of step b) and the cation exchange chromatography of step c) results in an effective depletion of the leached Protein A to non-detectable levels (<0.5 ppm).

The method provides samples with an excellent high relative purity. The relative purity after elution from the capture resin of step a) may be in the range of 75 to 95%, preferably of 80-95%, such as 81 to 94% defined as the percentage of the main peak in reversed phase ultra-high-performance chromatography (RP-UPLC). The relative purity after elution from the mixed-mode resin of step b) may be 90% or more, preferably 93% or more, more preferably 95% or more, such as 95% to 96% defined as percentage of the main peak in RP-UPLC. The relative purity after elution from the cation exchange chromatography of step c) may be 95% or more, preferably 96% or more, more preferably of 97% or more defined as the percentage of the main peak in RP-UPLC. The relative purity is defined as the percentage of the main peak in RP-UPLC.

The RP-HPLC method was applied to determine the purity of the sample and to quantify the product-related impurities. The RP-UPLC technique is based on separation of molecules according to their polarity. The separation was performed on a C-4 column with an acetonitrile/water gradient. The different molecules elute at different retention times due to their different hydrophobicity. The detection was based on UV absorption. The areas of the individual peaks representing product-related impurities and the Fc-peptide fusion protein are determined by integration and represented as a percentage of the total peak area. Quantification of the main peak is based on the area of the peak relative to an externally measured standard.

In specific embodiments, the ultrafiltration/diafiltration of step d) results in a formulated pharmaceutical composition or a pre-stage pharmaceutical composition.

In a preferred embodiment the formulated pharmaceutical composition or pre-stage pharmaceutical composition comprises the purified Fc-peptide fusion protein, water, a buffer, and at least one further compound selected from a detergent, a stabilizer, a salt, a sugar, and a polyol.

In the most preferred embodiment, the formulated pre-stage pharmaceutical composition is filled in glass vials, lyophilized, and sealed. Thereby resulting in the final pharmaceutical composition.

Thus, a further aspect of the invention refers to a method of producing of an Fc-peptide fusion protein in microorganisms wherein the Fc-peptide fusion protein is present in inclusion bodies;

1) Expression of an Fc-peptide fusion protein in microorganisms wherein the Fc-peptide fusion protein is present in inclusion bodies;
2) Lysis of the microorganisms;
3) Sedimentation of the inclusion bodies;
4) Solubilization of the inclusion bodies;
5) Refolding of the Fc-peptide fusion protein present in the inclusion bodies;
6) Adaption of the solution containing the refolded Fc-peptide fusion protein;
7) Purification of the Fc-peptide fusion protein
   a) performing an affinity capture chromatography;
   b) performing a mixed-mode chromatography;
   c) performing a cation exchange chromatography; and
   d) performing an ultrafiltration/diafiltration;
and optionally formulating the purified peptide into a pharmaceutical composition;
wherein the chromatographies a), b), and c) are performed in bind-elute mode, optionally with one or more washing steps.

BRIEF DESCRIPTION OF THE DRAWINGS

FIG. 1: Structure of a peptibody.
A schematic structure of an exemplary Fc-peptide fusion protein (peptibody). The example is romiplostim, the prototype of a peptibody. The exemplary peptibody is a homodimer composed of two identical chains each consisting of two tandem repeats of receptor-binding sequences that are separated by a linker and fused to the carboxy terminus of IgG1 Fc by another linker. The homodimeric molecule comprises twelve cysteines, forming two inter-chain and four intrachain disulfide bridges.

FIG. 2: Downstream process scheme of an Fc-peptide fusion protein expressed in inclusion bodies of bacteria.
A general process scheme including the lysis of bacteria, the solubilization of the Fc-peptide fusion protein out of inclusion bodies, the refolding into the desired structural conformation, the purification of the Fc-peptide fusion protein by a sequence of three chromatographies, and a final ultrafiltration/diafiltration step.

FIG. 3: Purification scheme of a refolded Fc-peptide fusion protein derived from inclusion bodies of bacteria.
A more detailed process scheme starting with the refolded Fc-peptide fusion protein. The affinity capture chromatography is followed by an intermediate mixed-mode chromatography and a final cation exchange chromatography. All three chromatographies are performed in bind-elute mode and the Fc-peptide fusion protein is eluted by a change of the pH in all three chromatographies. Prior to the intermediate mixed-mode chromatography a conditioning step leads to pH-induced precipitation. The final ultrafiltration/diafiltration step results in a formulated pharmaceutical composition or a pre-stage pharmaceutical composition.

FIG. 4: Purification scheme of a refolded Fc-peptide fusion protein, selected chromatographic media, and preparation of final pharmaceutical composition.

This figure discloses the finally selected and preferred chromatographic media (Table 1) and additionally comprises the final steps leading to a lyophilized pharmaceutical composition. The intermediate pre-stage pharmaceutical composition, designated as drug substance, is filtered and lyophilised resulting in the final pharmaceutical composition, designated as drug product.

FIG. 5: Relative purity of romiplostim over the whole purification process.

The relative purity which is defined as the main peak (MP) in RP-UPLC of three independent purification runs which increases significantly over the whole purification process, starting with the refolding step, followed by capture step, intermediate step, and the final polishing step.

DETAILED DESCRIPTION OF THE INVENTION

The present invention provides new methods for the purification of refolded Fc-peptide fusion proteins. In particular, it provides new methods for obtaining active Fc-peptide fusion proteins at high purity, which allows the industrial production of a pharmaceutical composition for human use.

Thus, a first aspect of the invention refers to a method for purification of a refolded Fc-peptide fusion protein from a composition comprising the Fc-peptide fusion protein and at least one impurity, the method comprising the following steps in the following order:
 a) performing an affinity capture chromatography in bind-elute mode;
 b) performing a mixed-mode chromatography in bind-elute mode;
 c) performing a cation exchange chromatography in bind-elute mode; and
 d) performing an ultrafiltration/diafiltration;
 wherein the chromatographies a), b), and c) are performed optionally with one or more washing steps.

As used herein, the term "refolded Fc-peptide fusion protein" refers to a polypeptide comprising a peptide, fused by gene technological methods to the Fc moiety of an immunoglobulin, recombinantly expressed in microorganisms in insoluble form or in a form of limited solubility, solubilized and refolded by redox treatment into the biologically active conformation. The term "refolded Fc-peptide fusion protein" refers to the correctly folded Fc-peptide fusion protein. The "refolded Fc-peptide fusion protein" is not expressed in eukaryotic cells, in particular not expressed in mammalian cells. Typically, the "refolded Fc-peptide fusion protein" is a non-glycosylated Fc-fusion peptide. It contains two intermolecular and four intramolecular correctly formed disulfide bonds. More particular, it refers to a Fc-peptide fusion protein that contains a sulfide configuration consisting of the following 6 disulfide bonds: the disulfide bonds connecting cysteine C206 and cysteine C148 within each monomer, the disulfide bonds connecting cysteine C102 and cysteine C42 within each monomer, the disulfide bond connecting the two monomer strands with each other, each at their cysteine C10 and the disulfide bond connecting the two monomer strands with each other, each at their cysteine C7.

"Fc-peptide fusion" means the gene fusion of a DNA encoding a target peptide to the DNA encoding the Fc-moiety, i.e. CH2/CH3 domains, of an immunoglobulin, expressing one single polypeptide.

The term "Fc" refers to the Fc domain, the crystallisable fragment, of an antibody. Preferably, the term "Fc" refers to the Fc fragment of an IgG1 immunoglobulin.

The term "peptide" refers to an amino acid sequence having less than 500 amino acids, preferably less than 200 amino acids, such as less than 100 amino acids, less than 50 amino acids, for example 41 amino acids.

In a specific embodiment, the peptide comprises at least one binding sequence. Preferably the peptide comprises an amino acid sequence that is a receptor agonist, preferably a mimetic of a natural occurring receptor agonist, more preferably, a thrombopoietin mimetic, i.e. having a TPO-binding sequence. In particular, the peptide comprises a tandem repeat of the TPO-binding sequence, optionally separated by a linker. In a specific embodiment, the peptide comprises the sequence TPO-binding sequence-linker-TPO-binding sequence-linker, wherein the C-terminal linker is fused to the Fc part of the Fc-peptide fusion protein.

The terms "Fc-peptide fusion protein", "Fc-fusion peptide", "Peptide-Fc fusion protein" and "peptibody" are used interchangeably herein and refer to recombinant polypeptides engineered by fusing a gene coding for a biologically active peptide in frame with the gene coding for an Fc domain of an IgG resulting in a peptide-IgG(Fc) chimera with antibody-like structure. In particular, the Fc domain including the peptide is dimerized, resulting in a homodimeric structure of the Fc-peptide fusion protein. The term "Fc-peptide fusion protein" does not include full length proteins fused to an Fc domain.

As used herein, the term "redox treatment" refers to the refolding process of the unfolded or partially unfolded, monomeric Fc-peptide fusion protein. The presence of a redox system such as glutathione red/ox (GSH/GSSG) or cysteine/cysteine allows thiol-disulfide interchange during the refolding step and promotes the disulfide formation. In the case of Fc-peptide fusion proteins the redox treatment should result in dimerization of the primarily expressed monomer (see background of the invention).

Further treatments of the refolded Fc-peptide fusion protein prior to the purification via chromatographic steps may be centrifugation, ultrafiltration, diafiltration, depth filtration, microfiltration, dilution, or pH-adjustment.

As used herein, the term "pre-stage pharmaceutical composition" refers to a pharmaceutical composition, which undergoes further adaptions to achieve the final product stage. These adaptions may comprise filtration, dilution or concentration, adjustment of pH and/or osmolarity, and lyophilization. In a preferred embodiment, the pre-stage pharmaceutical composition is a formulated bulk drug substance stored frozen or liquid, which requires just filtration and aliquoting into the final containers, such as vials, syringes, ampoules or carpules. In another preferred embodiment, the pre-stage pharmaceutical composition is just sterile-filtered, aliquoted into the final containers, i.e. glass vials, then lyophilized, and sealed.

The term "impurity" refers to any material that is different to the Fc-peptide fusion protein of interest. The term "impurity" includes "process-related impurities" and "product-related impurities". "Process-related impurity" that are derived from either the upstream or downstream parts of the manufacturing process comprise host cell proteins (HCP), host cell DNA (HCDNA), endotoxins, viruses, lipids, RNA, various leachates from process materials, such as leached Protein A, culture media components, cell debris, and aggregates and fragments thereof. "Product-related impurities"

comprise sulfide variants of the Fc-peptide fusion protein, e.g. reduced forms, free cysteine, and disulfide mismatches of monomer and dimer variants, moreover it comprises charged variants, aggregates, oxidised species, deamidated species, carbamoylated species, C- and N-terminally truncated species, monomers, and other undesired product variants of the Fc-peptide fusion protein. The term "product-related impurities" particularly relates to sulfide variants of the Fc-peptide fusion protein.

In particular the term "sulfide variant" refers to the Fc-peptide fusion protein that contains a sulfide configuration which differs in one or several disulfide bonds of the group of 6 disulfide bonds consisting of the disulfide bonds connecting cysteine C206 and cysteine C148 within each monomer, and the disulfide bonds connecting cysteine C102 and cysteine C42 within each monomer, the disulfide bond connecting the two monomer strands each at their cysteine C10 and the disulfide bond connecting the two monomer strands each at their cysteine C7.

The term "mismatched" refers to incorrectly paired disulfide bonds. The term refers to modifications of the disulfide bonds in the interchain and intrachain of the Fc-peptide fusion protein, particularly it refers to disulfide bond modifications in the monomer and dimer variants of the Fc-peptide fusion protein. The terms "free cysteine", "open disulfide", "open disulfide bond" or "open disulfide bridge" relate to incorrect cysteine oxidation. The term "disulfide bond" refers to a functional group with the structure R—S—S—R and the linkage is called disulfide bridge which is usually derived by two thiol groups in two cysteine residues. In a specific embodiment, the term "product-related impurities" refers to monomers and dimers of the Fc-peptide fusion protein with open disulfide bonds.

The term "precipitation" refers to impurities, which are non-soluble or have a limited solubility, and/or are in a non-soluble state. Precipitations may lead to turbid sample solutions.

As used herein the term "chromatography media" or "chromatography medium" has to be understood as a chromatography material or media in form of beads, plates, crystals, monoliths, membranes, fibers, meshwork of fibers or any other solid phase. The "media" bears functional groups referred to as "ligands" bound to a backbone, directly or via spacer, referred to as "matrix". An exception are gel chromatography resins for size exclusion chromatography which are typically without any attached ligand. The term "media" does not limit the methods of the invention to only column chromatography employing chromatography resins but also includes other types of chromatography, for example membrane chromatography employing membrane adsorbers. In particular, in ion exchange chromatography an ion exchange chromatography resin or an ion exchange chromatography membrane adsorber are both comprised by the invention.

"Resin" means any chromatographic material or medium in form of beads comprising a matrix with a bound functional group (ligand) which may interact with the protein or at least one contaminant. An exception are gel chromatography resins for size exclusion chromatography which are typically without any attached ligand. Resins may be supplied as beads of different sizes and packed in columns. Alternatively, pre-packed columns may be utilized.

By the term "matrix" or "solid phase" is meant a non-aqueous, non-soluble matrix to which the ligand can adhere. The matrix of interest herein is generally one, which comprises glass, ceramic, silica, cellulose, agarose, methacrylate polymer or polystyrene.

By "ligand" is meant any functional group, which interacts with the Fc-peptide fusion protein or with at least one contaminant and which is covalently bound to the "matrix".

The term "binding mode" or "bind and elute mode" refers to chromatography conditions in which a sample containing the Fc-peptide fusion protein to be purified is applied to a chromatography medium, wherein the Fc-peptide fusion protein binds to the chromatography medium. Thus, the Fc-peptide fusion protein is retained on the chromatography medium, whereas the impurities of the sample may be present in the non-binding fraction, also called the flow-through fraction. When a chromatography step is carried out in the binding mode, one or more washing steps may be performed after the binding of the Fc-peptide fusion protein to the chromatography medium and prior to eluting the Fc-peptide fusion protein from the medium. To obtain the Fc-peptide fusion protein, the Fc-peptide fusion protein is then eluted and obtained in the eluate, which may then further be purified in a further chromatographic step, if desired. Elution of the Fc-peptide fusion protein may be performed using selective conditions permitting contaminants to remain bound to the medium while the Fc-peptide fusion protein is eluted.

Performing a chromatography step in the "binding mode" does not necessarily mean that 100% of the Fc-peptide fusion protein is bound. In the context of the present invention "bound to the chromatography resin" or "bound to the chromatography medium" means that at least 50% of the Fc-peptide fusion protein is bound, preferably at least 75% of the Fc-peptide fusion protein is bound, more preferably at least 85% of the Fc-peptide fusion protein is bound, and most preferably more than 95% of the Fc-peptide fusion protein is bound to the resin or medium.

In the context of the present invention, it is understood, that the capture affinity chromatography step, the intermediate mixed-mode chromatography step, and the polishing cation exchange chromatography step are all performed in the binding mode, wherein the capture step is considered the first chromatography step, which is performed in the binding mode. Alternatively, the final polishing cation exchange chromatography step of the invention may be performed twice in series, wherein the two chromatographies are performed with the same chromatography medium in a bind-elute mode, and wherein the two chromatographies are performed under different conditions, optionally with one or more washing steps.

In a preferred embodiment, the bound Fc-peptide fusion proteins of the first cation exchange chromatography is eluted by an increase of the pH value, and the bound Fc-peptide fusion proteins of the second cation exchange chromatography is eluted by an increase of ionic strength. It is further understood that the second cation exchange chromatography is optional and a sequence of just three chromatographies is most preferred, i.e. affinity chromatography, mixed-mode chromatography, and cation exchange chromatography will result in sufficient purity in most cases. In the most preferred embodiment, the elution of bound Fc-peptide fusion protein is performed by a pH gradient or pH step in all three chromatographies.

The term "flow-through mode" refers to chromatography conditions in which a sample containing the Fc-peptide fusion protein of interest is applied to the chromatography resin or medium, wherein the Fc-peptide fusion protein does not bind to the chromatography resin but is mainly present in the fraction that is not bound to the resin or medium and thus contained in the flow-through. The developed chromatographies of the present invention do not make use of the flow-through mode. However, the methods of the present inventions may be supplemented by additional intermediate or polishing chromatographies in a flow though mode. Impurities may bind to the resin or medium in this mode.

As additional intermediate or polishing steps, also other chromatography types can be employed. For example, anion exchange column chromatography and anion exchange membrane chromatography may be employed as intermediate or polishing step, most preferred in flow-through mode. Another possibility is to apply hydroxyapatite chromatography, in particular ceramic hydroxyapatite chromatography in binding mode.

The "wash step" or "washing step" is a step performed in a chromatography in binding mode, after the Fc-peptide fusion protein is loaded onto the chromatography column, but before the Fc-peptide fusion protein is eluted from the column. The wash step additionally removes contaminants less tightly or nonspecifically bound to the matrix, to the Fc-peptide fusion protein, and/or to the ligand, without significantly eluting the Fc-peptide fusion protein from the resin. In the wash step, the resin is washed with the desired wash buffer (e.g. the wash buffer is passed through the chromatography column until the UV absorption measured in the outlet of the column returns to baseline). During the wash steps the protein of interest remains bound to the chromatography medium.

The term "elution" is understood as a process, which desorbs a protein of interest from a chromatography medium by altering the solution conditions such that buffer components compete with the protein of interest for the ligand site on the chromatography resin. Another mode of elution occurs in affinity chromatography, for example using Protein A. In this case, the elution buffer may alter the conformation of the ligand or the Fc-peptide fusion protein, thereby loosening the binding. An Fc-peptide fusion protein may be eluted from ion exchange resins by altering the ionic strength of the buffer surrounding the ion exchange material such that the buffer ions in the mobile phase compete with the molecule for the charged ionic sites of the ion exchange resin. Alternatively, a change in the pH influences the amphoteric protein and a pH increase above the pI of the protein henceforth prevent its binding to a cation exchange resin and the protein elutes. The same effect occurs on an anion exchange chromatography resin when the pH is decreased below the pI of the protein. As understood herein the term "elution" comprises isocratic elution, single step elution, and gradient elution, with or without preceding wash steps. The elution of the Fc-peptide fusion protein may be conducted by increasing the ionic strength or conductivity in the mobile phase, which is affected by increasing the salt concentration in the buffer solution. Alternatively, an increase or decrease in the pH value may be suitable. Discontinuous step gradients, linear gradients, non-linear gradients or a suitable combination of such gradients may be employed.

Buffers suitable for washing and for elution can be selected from acetate, citrate, succinate, maleate, malonate, Tris-HCl, Tris-phosphoric acid, Tris-acetate, Tris-glycine, phosphate, succinate, MES, MOPS, PIPES, PHEPES, ethanolamine, bistris, glycine, histidine, and other suitable buffers with the addition of salts such as phosphates, sulfates, or chlorides, such as NaCl or KCl. The ionic strength and the salt concentration, by means of which the elution is achieved, are dependent on the pH value of the buffer solution and the pI of the Fc-peptide fusion protein. The wash buffer may further comprise a detergent (e.g. polysorbate), a solvent (e.g. hexylene glycol, isopropanol, or ethanol), or a polymer (e.g. polyethylene glycol). Furthermore, the wash buffer may include chaotropic reagents (e.g. urea or arginine) and/or protease inhibitors (e.g. EDTA).

As used herein the term "buffer" refers to a solution that resists changes in the pH by the action of acid-base conjugate components.

The method of the invention may be used for Fc-peptide fusion protein purification at small and large scale. Preferably, the method is carried out at large scale.

"Small scale", also denoted as "laboratory scale", refers to purification of samples containing less than 5 g Fc-peptide fusion protein, less than 2.5 g Fc-peptide fusion protein, or less than 1 g Fc-peptide fusion protein. "Small scale" also refers to purification processes in which the protein eluted from the column of the capture step amounts to less than 5 g Fc-peptide fusion protein, less than 2.5 g Fc-peptide fusion protein, or less than 1 g Fc-peptide fusion protein.

"Large scale", also called "production scale" or "manufacturing scale" or "commercial scale", refers to purification of samples containing more than 5 g Fc-peptide fusion protein, more than 20 g Fc-peptide fusion protein, more than 50 g Fc-peptide fusion protein or more than 100 g Fc-peptide fusion protein. "Large scale" also refers to purification processes in which the protein eluted from the column of the capture step amounts to more than 5 g Fc-peptide fusion protein, more than 20 g Fc-peptide fusion protein, more than 50 g Fc-peptide fusion protein or more than 100 g Fc-peptide fusion protein.

The chromatographies of steps a), b) and c) may be eluted with a pH gradient or a pH step. Preferably, the pH gradient is a linear pH gradient.

Expression and Refolding

The present invention does not depend on specific methods for expression and refolding of Fc-peptide fusion proteins. However, the following general features, which are not mandatory, could be applied:

Expression in microorganisms, preferably in bacteria, more preferably in *E. coli*

Expression in insoluble form or forms of limited solubility, preferably within microorganisms, more preferably within inclusion bodies Harvest of microorganisms, preferably by centrifugation Lysis of microorganisms, preferably by mechanical means Sedimentation of insoluble material, preferably isolation and washing of inclusion bodies Solubilization with suitable methods, preferably with chemical agents, most preferably with chaotropic agents under reductive conditions Refolding incubation, preferably at high pH and with redox compounds, more preferably the redox compounds are sulfhydryl redox pairs Adaption of refold solution prior to affinity capture chromatography, preferably by filtration, pH adjustment, and dilution In the experiments which led to the present invention it was observed that the refold solutions of Fc-peptide fusion proteins contained several different product variants along with the Fc-peptide fusion protein of interest to be purified which bind to the affinity capture resin. In particular, various sulfide variants of the Fc-peptide fusion protein turned out to be the most difficult impurities to deplete during the purification process and in structural analysis as well. The present invention provides a solution how to reduce these impurities in the final product.

Preferably the ph of the composition comprising the Fc-peptide fusion protein and at least one impurity is adjusted to a pH in the range of 4 to 6, preferably 4.5 to 5.5, more preferably 5.

Capture Chromatography Step: Affinity Chromatography

The term "capture step" is understood as the first chromatography step conducted in the binding mode. The capture step for purification of an Fc-peptide fusion protein or an immunoglobulin is usually carried out as an affinity chromatography step. Protein A or derivatives or analogues thereof are mostly used as affinity capture. According to the present invention affinity chromatography was successfully used to capture Fc-peptide fusion proteins. The term "affinity chromatography" for this invention means a method of selectively binding the Fc-moiety out of the refold solution based on a highly specific interaction between a ligand and the Fc-moiety.

As used herein, the term "Protein A affinity chromatography" refers to affinity chromatography which employs as ligands natural or recombinant proteins of microbial origin (e.g. *Staphylococcus aureus, Streptococcus, Peptostreptococcus magnus*) or variants derived thereof, or synthetic peptides that may be of microbial origin with the ability to bind to Fc-moieties of immunoglobulins. Exemplary immunoglobulin binding proteins may be Protein A, Protein G, Protein L, or Protein A/G. Preferably, the immunoglobulin-Fc binding protein or peptide is Protein A. The ligands can comprise one or more of the E, D, A, B, and C domains of Protein A. More preferably, the ligands comprise domain B of protein A or the engineered protein Z. An exemplary resin employing as ligand a 14 kDa peptide recombinantly produced with *Saccharomyces cerevisiae* is IgSelect (GE Healthcare). This ligand was specifically designed for high affinity to all subclasses of human IgG-Fc. By using a Protein A affinity chromatography step as the capture step after the refolding of Fc-peptide fusion proteins the method takes advantage of the significant binding specificity of Protein A affinity chromatography in the purification of immunoglobulins.

In a preferred embodiment, the Protein A chromatography resin used for the capture step comprises an alkali-tolerant Protein A derivative as a ligand, bound to highly cross-linked agarose. In a more preferred embodiment, the alkali-tolerant Protein A derivative is an alkali-stabilized tetramer variant of domain B of Protein A.

In order to make the Protein A affinity chromatography resin more resistant to harsh cleaning conditions and to provide protection against inter-run cross-contamination effects, it is common today to use improved Protein A affinity resins, bearing ligands specially engineered to ensure alkali tolerance, high binding capacity, and low ligand leakage. One major drawback of these improved resins is, however, that they are significantly costlier than conventional Protein A resins. It is an important advantage of the method of the present invention that both conventional Protein A resins as well as the more recent new generation Protein A resin products can be used.

Examples of common Protein A resins that can be used for the purpose of the invention may include, but are not limited to, Unosphere SUPrA™ (Bio-Rad), Protein A Ceramic HyperD F™ (Pall Corporation), Poros MabCapture A™ (Applied Biosystems), ProSep HC™, ProSep Ultra™, and ProSep Ultra Plus™ (EMD Millipore), Protein A Sepharose FF™, rProtein A Sepharose FF™, rmp Protein A Sepharose FF™, MabSelect™, MabSelect SuRe™, MabSelect SuRe LX™, MabSelect Xtra™, MabSelect PrismA™ (GE Healthcare), and Toyopearl rProtein A™ (Tosoh Bioscience). When used herein, the term "Protein A" encompasses Protein A recovered from a native source thereof, Protein A produced synthetically or biosynthetically (e.g. by peptide synthesis or by recombinant techniques), and variants thereof which retain the ability to bind proteins which have CH2/CH3 and/or Fc regions. Preferably, resins with high binding capacity and/or alkaline stability may be used. For example, Protein A, Protein A derivative, or alkali-stabilized Protein A-derived affinity medium may be used. Preferably, alkali-stabilized Protein A-derived (E. coli) ligands may be used. The alkali-stabilized Protein A-derived ligand may be coupled to a highly cross-linked agarose matrix, preferably immobilized with a chemically stable thio-ether linkage. One example is MabSelect SuRe™ from GE Healthcare Life Sciences, which can be rapidly and efficiently cleaned after the run with up to 0.5 M NaOH. The alkali-stabilized ligand of MabSelect SuRe™ is derived from the B domain of Protein A and essentially lacks the V3 binding domain giving a higher elution pH. A preferred product is MabSelect SuRe LX™ which has a higher binding capacity than MabSelect SuRe™.

In a preferred embodiment, the Protein A equilibration buffer contains at least one chaotropic agent selected from the group consisting of arginine and urea. The most preferred equilibration buffer is ethanolamine including arginine and urea. The preferred starting pH is about pH 4.5 to 7, more preferably about pH 5 to 6, most preferably about pH 5.

One or several wash steps between the sample load on the Protein A affinity column and the elution of the Fc-peptide fusion protein from the Protein A column may be included employing special wash buffer(s). The wash buffer is the buffer used to remove impurities from the Protein A resin without removing significant amounts of the Fc-peptide fusion protein of interest bound to the Protein A. The wash buffer may comprise salt and detergent (e.g. polysorbate); salt and solvent (e.g. hexylene glycol); high concentration salt (e.g. high molarity Tris buffer); or salt and polymer (e.g. polyethylene glycol). Furthermore, the wash buffer may include chaotropic reagents (e.g. urea or arginine) and/or protease inhibitors (e.g. EDTA). Finally, the wash buffer may have a lower pH as the loading buffer and/or a higher pH as the elution buffer.

A preferred wash buffer for Protein A is ethanolamine with arginine and urea. The preferred pH is about pH 4.5 to 7, more preferably about pH 5 to 6, most preferably about pH 5.

For the elution of the Fc-peptide fusion protein of interest from the Protein A column an elution buffer is applied. Preferably, the elution buffer has a low pH and thereby disrupts interactions between Protein A and the Fc-peptide fusion protein of interest by changing the protein conformation. Preferably, the low pH elution buffer has a pH in the range from about 2 to about 5, most preferably in the range from about 3 to about 4. Examples of buffers that will control the pH within this range include phosphate, acetate, citrate, glycine, and ammonium buffers, as well as combinations of these.

Preferably, the elution buffer of the capture step, e.g. the Protein A chromatography, contains urea. The concentration of the urea in the elution buffer may be about 0.1 M or more, such as about 0.3 M or more, preferably 0.5 M or more. In some embodiments, the concentration of the urea in the elution buffer is in the range of about 0.1 M to about 3 M, preferably in the range of 0.3 M to 2 M, more preferably in the range of about 0.5 M to about 1 M, most preferably the concentration of the urea in the elution buffer is about 0.5 M.

Preferred buffers are citrate and acetate buffers. Other elution buffers are contemplated, including high pH buffers (e.g. those having a pH of 9 or more) or buffers comprising a compound or composition such as $MgCl_2$ (2 mM) for eluting the Fc-peptide fusion protein of interest. The buffer may have a citrate (such as sodium-citrate) concentration of 20 mM to 200 mM, preferably 50 mM to 150 mM citrate, most preferably of 100 mM.

A preferred Protein A elution buffer for step elution is sodium-citrate with urea at pH 3 to 4.

A more preferred Protein A elution method is gradient elution with a decreasing pH gradient. Typically, the gradient is a linear gradient. The gradient elution may be performed with sodium-citrate with urea. The pH gradient may start at about pH 5.5 and may end at about pH 2.5. The gradient may be generated by mixing two buffers (e.g. starting with 100% Buffer A having a pH of about 5.5 and mixing into it buffer B having a pH of about 2.5 until 100% of buffer B is reached). Buffer A and Buffer B may contain citric acid with urea. The decreasing linear pH gradient elution may comprise two or more, preferably three segments. For example in segment (i) within 1 to 3 column volumes, preferably within 1 column volume, the percentage of buffer B is raised from 0% to a content in the range of about 20% to about 50%, preferably of about 30% to about 40%, such as 37%, in segment (ii) buffer B is further raised within 5 to 20 CV, preferably 10 to 15 CV, such as 13.8 CV, to an content in the range of about 60% to about 95%, preferably about 70% to about 80%, such as about 75% and in segment (iii) buffer B is raised within 1 to 3 CV, preferably 1 CV to a final content of about 90% or more, preferably about 95% or more, more preferably about 100%. In a further embodiment, the decreasing linear pH gradient elution may comprise three or more, preferably four segments. For example in segment (i) buffer B is raised within 0.01 to 0.5 column volumes, preferably within 0.1 column volume, the percentage of buffer B is raised from 0% to a content in the range of about 10% to about 20%, such as 17%, in segment (ii) buffer B is raised within 1 to 3 column volumes, preferably within 1 column volume, the percentage of buffer B is raised from 0% to a content in the range of about 20% to about 50%, preferably of about 30% to about 40%, such as 37%, in segment (iii) buffer B is further raised within 5 to 20 CV, preferably 10 to 15 CV, such as 13.8 CV, to an content in the range of about 60% to about 95%, preferably about 70% to about 80%, such as about 75% and in segment (iv) buffer B is raised within 0.1 to 1 CV, preferably 0.5 CV to a final content of about 90% or more, preferably about 95% or more, more preferably about 100%.

The Protein A eluate is directly collected in a stabilizing buffer. Preferably, the Protein A chromatography eluate is diluted at-line under stirring into a stabilizing buffer comprising D-mannitol, sucrose, L-histidine, polysorbate 20 (Tween 20™) pH 5.0. Preferably, the Protein A chromatography eluate is diluted to a final protein concentration of about 0.5 to 3 mg/mL, preferably to about 1.5 to 2.5 mg/mL, such as to about 1.8 mg/mL.

Hence, a specific embodiment refers to a method for purification of a refolded Fc-peptide fusion protein from a composition comprising the Fc-peptide fusion protein and at least one impurity, the method comprising the following steps in the following order:
 a) performing an affinity capture chromatography in bind-elute mode; and
 b) performing a mixed-mode chromatography in bind-elute mode; and
 c) performing a cation exchange chromatography in bind-elute mode; and
 d) performing an ultrafiltration/diafiltration; and
 wherein the chromatographies a), b), and c) are performed optionally with one or more washing steps, and
 wherein the Fc-peptide fusion protein is eluted from the affinity chromatography medium of step a) with a decreasing pH gradient.

In a preferred embodiment, the invention refers to a method for purification of a refolded Fc-peptide fusion protein from a composition comprising the Fc-peptide fusion protein and at least one impurity, the method comprising the following steps in the following order:
 a) performing a Protein A capture chromatography in bind-elute mode; and
 b) performing a mixed-mode chromatography in bind-elute mode; and
 c) performing a cation exchange chromatography in bind-elute mode; and
 d) performing an ultrafiltration/diafiltration; and
 wherein the chromatographies a), b), and c) are performed optionally with one or more washing steps, and
 wherein at least one buffer used for the Protein A chromatography of step a) includes urea; and
 wherein the Fc-peptide fusion protein is eluted from the Protein A chromatography medium of step a) with a decreasing pH gradient; and
 wherein the Protein A chromatography medium of step a) comprises an alkali-tolerant Protein A derivative as a ligand, preferably an alkali-stabilized tetramer variant of domain B of Protein A bound to a cross-linked agarose matrix.

In a specific embodiment, the invention refers to a method for purification of a refolded Fc-peptide fusion protein from a composition comprising the Fc-peptide fusion protein and at least one impurity, the method comprising the following steps in the following order:
 a) performing a Protein A capture chromatography in bind-elute mode, wherein the eluate is collected in a stabilizing buffer; and
 b) performing a mixed-mode chromatography in bind-elute mode; and
 c) performing a cation exchange chromatography in bind-elute mode; and
 d) performing an ultrafiltration/diafiltration; and
 wherein the chromatographies a), b), and c) are performed optionally with one or more washing steps, and
 wherein at least one of the wash and the elution buffer used in the Protein A chromatography of step a) includes urea; and
 wherein the Fc-peptide fusion protein is eluted from the Protein A chromatography medium of step a) with a decreasing pH gradient; and
 wherein the Protein A chromatography medium of step a) comprises an alkali-tolerant Protein A derivative as a ligand, preferably an alkali-stabilized tetramer variant of domain B of Protein A bound to a cross-linked agarose matrix,
 wherein the stabilizing buffer of step a) comprises D-mannitol, sucrose, L-histidine, polysorbate 20 (Tween 20™), pH 5.0.

Intermediate Chromatography Step: Mixed-Mode Chromatography

The method of the invention further comprises a mixed-mode chromatography step as intermediate step, i.e. it is carried out in the downstream sequence after the affinity chromatography.

The media referred to as mixed-mode media or resins are chromatographic media possessing functional groups consisting of either charged hydrophobic ion exchange ligands or crystalline minerals such as hydroxyapatite or fluorapatite. Instead of "mixed-mode chromatography" the term "multi modal chromatography" or in connection with a specific procedure "hydrophobic charge induction chromatography" is sometimes used. Mixed-mode chromatography is an interaction of at least two principles, hydrophobic interaction and ion exchange or metal affinity interaction and ion exchange. Mixed-mode chromatography provides less predictable selectivity that cannot be reproduced by a single mode chromatography method such as ion exchange or hydrophobic interaction chromatography, respectively. Positively charged hydrophobic ligands belong to the group of anion exchanger mixed-mode (for example multimodal anion exchange (AIEX) resin CaptoAdhere™), and the negatively charged ligands belong to the cation exchanger mixed-mode (for example Capto™ MMC (multimodal cation exchanger)). Some mixed-mode media have zwitterionic character (for example Bakerbond ABxTM). Other mixed-mode media possess hydrophobic ligands which are ionisable and convert from uncharged to positively charged by lowering the pH (for example MEP HyperCel™). Finally, hydroxyapatite and fluorapatite media have more complex mixed-mode functions by possessing positively charged calcium ions and negatively charged phosphate groups.

In a preferred embodiment the mixed-mode chromatography used as intermediate step utilizes a resin having hydrophobic and anion exchange functions. More preferred are mixed-mode resins containing positively charged N-benzyl-N-methyl ethanolamine ligands, which are bound to a highly cross-linked agarose matrix.

The most preferred mixed-mode resin used for intermediate step b) is CaptoAdhere ImpRes™ (column for post-protein A purification of monoclonal antibodies) (GE Healthcare Life Science).

The following conditions may be applied when loading the positively charged mixed-mode chromatography resin in the bind-elute mode: pH 6 to pH 9, preferably about pH 6.5 to 8; most preferably about pH 7. Optionally, one or more washing steps may be used. The conditions depend on the pI of the Fc-peptide fusion protein and can be specifically adjusted according to the desired separation. The decreasing pH gradient elution is the preferred mode for the mixed-mode chromatography. In the most preferred embodiment, the gradient is performed with sodium phosphate buffer, starts at about pH 7, and ends at about pH 5.

In a preferred embodiment, the pH gradient elution for the mixed-mode chromatography may be performed with sodium phosphate with NaCl. The gradient may be generated by mixing two buffers (e.g., starting with 100% Buffer A having a pH of about 7 and mixing into it buffer B having a pH of about 5 until 70% of buffer B is reached). The decreasing pH gradient elution may comprise two segments. For example in segment (i) buffer B is increased within 1 to 3 CV, preferably within 2 CV, the percentage of buffer B is raised from 0% to a content in the range of about 5% to 50%, preferably of about 10% to about 30%, such as 20% and in segment (ii) buffer B is further increased within 5 to 30 CV, preferably 10 to 20 CV, such as 16.7 CV, to an content in the range of about 60% to about 95%, preferably about 65% to about 80%, such as about 70%.

In some embodiments, the invention refers to a method for purification of a refolded Fc-peptide fusion protein derived from inclusion bodies of microorganisms from a composition comprising the Fc-peptide fusion protein and at least one impurity, the method comprising the following steps in the following order:
  a) performing a Protein A capture chromatography in bind-elute mode; optionally with one or more washing steps; and
  b) performing a mixed-mode chromatography in bind-elute mode; optionally with one or more washing steps; and
  c) performing a cation exchange chromatography in bind-elute mode, optionally with one or more washing steps; and
  d) performing an ultrafiltration/diafiltration; and
  wherein the Fc-peptide fusion protein is eluted from the mixed-mode chromatography medium of step b) with a decreasing pH gradient from about pH 7 to about pH 5; and
  wherein the mixed-mode chromatography medium of step b) comprises positively charged N-benzyl-N-methyl ethanolamine as a ligand bound to a highly cross-linked agarose matrix; and
  wherein the buffers used for the mixed-mode chromatography are phosphate buffers, preferably sodium phosphate buffers with sodium chloride.

The positively charged mixed-mode chromatography step in binding mode separates charge variants of the Fc-peptide fusion protein and further reduces host cell proteins, host cell DNA, aggregates, fragments, sulfide variants, endotoxins, and leached Protein A.

In a preferred embodiment the mixed-mode chromatography is preceded by a conditioning step. The conditioning step prepares the Protein A elution pool for further purification. The conditioning step comprises the following steps: After a hold step the Protein A elution pool is diluted and the pH is adjusted. Preferably, the dilution is four times and the pH is adjusted to about pH 7. In a more preferred embodiment, the dilution is two times and the pH is adjusted to about pH 7. Preferably, the buffer is sodium phosphate. NaCl is added to a final concentration of 25 mM. The conditioned Protein A elution pool is incubated and filtered. Preferably, the incubation is performed for about 30 to about 60 minutes.

In some embodiments, the invention refers to a method for purification of a refolded Fc-peptide fusion protein derived from inclusion bodies of microorganisms from a composition comprising the Fc-peptide fusion protein and at least one impurity, the method comprising the following steps in the following order:
  a) performing a Protein A capture chromatography in bind-elute mode; optionally with one or more washing steps; and
  b) performing a mixed-mode chromatography in bind-elute mode; optionally with one or more washing steps; and
  c) performing a cation exchange chromatography in bind-elute mode, optionally with one or more washing steps; and
  d) performing an ultrafiltration/diafiltration; and
  wherein the mixed-mode chromatography medium of step b) is preceded by a conditioning step; and
  wherein the conditioning step comprises dilution, pH adjustment, incubation, and filtration of the eluate of the Protein A capture chromatography of step a).

In some embodiments, the invention refers to a method for purification of a refolded Fc-peptide fusion protein from a composition comprising the Fc-peptide fusion protein and at least one impurity, the method comprising the following steps in the following order:
- a) performing an affinity capture chromatography in bind-elute mode using alkali-stabilized Protein A derivative as ligand;
- b) performing a mixed-mode chromatography in bind-elute mode using N-Benzyl-N-methyl ethanol amine as ligand;
- c) performing a cation exchange chromatography in bind-elute mode using R—SO$_3^-$ as ligand; and
- performing an ultrafiltration/diafiltration;
- wherein the chromatographies a), b), and c) are performed optionally with one or more washing steps.

In more specific embodiments, the invention refers to a method for purification of a refolded Fc-peptide fusion protein from a composition comprising the Fc-peptide fusion protein and at least one impurity, the method comprising the following steps in the following order:
- d) performing an affinity capture chromatography in bind-elute mode using alkali-stabilized Protein A derivative as ligand;
- e) performing a mixed-mode chromatography in bind-elute mode using N-Benzyl-N-methyl ethanol amine as ligand;
- f) performing a cation exchange chromatography in bind-elute mode using R—SO$_3^-$ as ligand; and
- g) performing an ultrafiltration/diafiltration;
- wherein the chromatographies a), b), and c) are performed optionally with one or more washing steps,
- wherein the Fc-peptide fusion protein is eluted from the affinity chromatography medium of step a) with a decreasing pH gradient.

Polishing Chromatography Step: Cation Exchange Chromatography

The method as described herein further comprises a cation exchange chromatography step as polishing step.

Cation exchange chromatography relies on charge-charge interactions between the proteins in the sample and the charges immobilized on the resin. In cation exchange chromatography, the molecules to be bound are positively charged and the immobilized functional groups (ligands) are negatively charged. Commonly used cation exchange resins are S-resins, (sulfonate), SP resins (sulfopropyl), SiB resins (sulfoisobutyl), SE resins (sulfoethyl), and CM resins (carboxymethyl).

However, in general the cation exchange chromatography step can be performed with all common commercially available cation exchange resins or membranes. Cation exchange resins may be used in the form of pre-packed columns or membranes on which the functional group, e.g. sulfonic acid, is fixed. Alternatively, the resins may be purchased as bulk material and the columns packed by the user. There are no specific limitations as to the capacity and the dimension of the columns other than the usual ones. The person skilled in the art knows the amount of cation exchange resin and the size of the column to be used. This depends on the overall scale of the process.

Typical commercially available products include, for example, Macro-Prep High S™, Macro- Prep CM™, Unosphere Rapid S™, Unosphere Rapid S40™, Nuvia S™, and Nuvia HR-S™ (Bio-Rad, California, USA), Toyopearl CM™, Toyopearl SP™, Toyopearl Sulfate 650 F™, and Toyopearl GigaCap S™ (Tosoh Bioscience, Germany), Millipore ProRes S™, Fractogel EMD COO-™, Fractogel EMD SO3-™, Fractogel EMD SE Hicap™, Eshmuno CPX™ (Merck KGaA, Germany), Biosepra CM Ceramic HyperD™, Biosepra S Ceramic HyperD™, S HyperCel™ (Pall Corporation, New York, USA), Poros HS™, Poros XS™ (Applied Biosystems, Germany), YMC BioPro SmartSep 30S™, YMC BioPro SmartSep 70S™ (YMC Europe) CM-Sepharose FF™, SP-Sepharose FF™, S-Sepharose FF™ SP-Sepharose HP™, SP-Sepharose XL™, SP-Sepharose Big Beads™, CM-Sephadex™, Capto S™, Capto SP ImpRes™, and Source S™ (all GE Healthcare, Germany).

Preferred cation exchange resins of this invention are strong cation exchangers using sulfonate, sulfopropyl, or sulfoisobutyl ligands. More preferred are sulfonate or sulfopropyl ligands linked to rigid matrices such as highly cross-linked agarose, e.g. Nuvia HR-S™, or poly (styrenevinylbenzene), e.g. Poros 50 HS™, or polymethacrylate, e.g. Fractogel EMD SO3-™. The most preferred cation exchange resin is the strong cation exchanger BioPro SmartSep S30TM (YMC Europe) with SO3-groups linked to a hydrophilic polymer matrix.

Commonly, cation exchange chromatography is performed using buffers at pH values between 4 and 7.

The cation exchange chromatography may be equilibrated with a buffer having a pH of about pH 4 to about pH 8, preferably of about pH 5 to pH 7. The buffer concentration may be in the range of 10 mM to 200 mM, preferably in the range of 50 mM to 100 mM.

Examples of buffers used for cation exchange chromatography are citric acid, lactic acid, succinic acid, formic acid, butanedioic acid, acetic acid, malonic acid, glycine, MES, PIPES, phosphate, bistris, Tris, or mixtures thereof. The selection of the buffer depends on the desired pH and the pI of the Fc-peptide fusion protein.

The preferred buffer used for the cation exchange chromatography is Tris. In a preferred embodiment the pH of the Tris buffer is adjusted with HCl or phosphoric acid.

For elution, an increase in the pH of the elution buffer may be used, provided either by a single step or a gradient.

A preferred embodiment for the performance of the cation exchange chromatography is a pH of about pH 5.5 to 7.5 for loading and washing, and a pH of about 6 to 8 for step elution.

In one embodiment, the eluate of the mixed-mode chromatography is loaded onto the cation exchange chromatography column after a hold step. Preferably, the hold step is carried out at a temperature of 2 to 10° C.

Thus, in a preferred embodiment, the invention refers to a method for purification of a refolded Fc-peptide fusion protein derived from inclusion bodies of microorganisms from a composition comprising the Fc-peptide fusion protein and at least one impurity, the method comprising the following steps in the following order:
- a) performing a Protein A capture chromatography in bind-elute mode; optionally with one or more washing steps; and
- b) performing a mixed-mode chromatography in bind-elute mode; optionally with one or more washing steps; and
- c) performing a cation exchange chromatography in bind-elute mode; and, optionally with one or more washing steps; and
- d) performing an ultrafiltration/diafiltration; and
- wherein at least one buffer used for the cation exchange chromatography of step c) is a Tris buffer; and
- wherein the Fc-peptide fusion protein is eluted by a single step from the cation exchange chromatography medium of step c) by an increase of the pH; and
- wherein the cation exchange chromatography medium of step c) is a strong cation exchange chromatography medium comprising charged groups —R-SO3- bound to a hydrophilic polymer matrix.

The cation exchange chromatography step separates charge variants of the Fc-peptide fusion protein and may further deplete residual host cell proteins, residual host DNA, aggregates, fragments, sulfide variants, endotoxins, and leached Protein A. As a polishing step, the various removed impurities are at very low quantities, i.e. traces only.

Alternatively, the cation exchange chromatography may be performed by utilizing gradient elution with an increasing ionic strength. Most preferred is a BioPro SmartSep S30™ chromatography with an L-arginine gradient elution. Sodium succinate buffer is a preferred buffer for this method, with a pH in the range of pH 5 to 7, preferably pH 6. The bound Fc-peptide fusion protein may be eluted by an increasing linear gradient of L-arginine in sodium succinate.

Optionally, the alternative cation exchange method with arginine gradient elution may be performed as a second cation exchange step (c2) following the first cation exchange chromatography with pH step elution (c1). This second cation exchange step under changed conditions can further deplete impurities if desired.

In some embodiments, step (c) is performed two times in series, the method comprising the step c) in the following order:
  c1) performing a first cation exchange chromatography; and
  c2) performing a second cation exchange chromatography;
  wherein the chromatographies c1) and c2) are performed with the same chromatography medium in bind-elute mode; and
  wherein the chromatographies c1) and c2) are performed under different conditions, optionally with one or more washing steps.

The different conditions comprise changes in pH or in conductivity by using step or gradient elution. In a preferred embodiment, the different conditions are a pH step elution (c1) and an arginine gradient elution (c2).

Tangential Flow Ultrafiltration/Diafiltration (TF-UF/DF)

Further, the method of the invention comprises a final ultrafiltration/diafiltration step. Ultrafiltration is a form of membrane filtration in which pressure forces a liquid against a semipermeable membrane. Suspended solids and solutes of high molecular weight are retained, while water and low molecular weight solutes pass through the membrane. Ultrafiltration is a commonly used method for separation, purifying and concentrating macromolecular solutions, especially protein solutions. Ultrafiltration may be combined with diafiltration. This mode is suitable for buffer exchange, to remove salts and other microspecies from the solution via repeated or continuous dilution and re-concentration. Ultrafiltration may be performed with stacked membranes in a tangential flow or cross flow filtration system (TFF or TF-UF), especially for processing large sample volumes. Besides cassettes, hollow fiber systems are commonly used for ultrafiltration. Membrane cut-off sizes range from about 1 to 300 kDa. For Fc-peptide fusion proteins, typical cut-offs for the ultrafiltration membranes are 10-50 kDa. Within the framework of the present invention, a molecular weight cut-off of 30 kDa for the UF membranes is preferred.

In a downstream sequence of a therapeutic protein an ultrafiltration/diafiltration step is often the final step and used for formulation of the protein drug. In addition, the final concentration can be adjusted. In case of an Fc-peptide fusion protein a preferred embodiment results in a formulated pharmaceutical composition or a pre-stage pharmaceutical composition. The pre-stage pharmaceutical composition may be the bulk drug substance, which is ready to be sterile filtered into vials and further undergoes lyophilization to form the final pharmaceutical composition.

In a specific embodiment, the invention refers to a method for purification of a refolded Fc-peptide fusion protein derived from inclusion bodies of microorganisms from a composition comprising the Fc-peptide fusion protein and at least one impurity, the method comprising the following steps in the following order:
  a) performing a Protein A capture chromatography in bind-elute mode, optionally with one or more washing steps; and
  b) performing a mixed-mode chromatography in bind-elute mode, optionally with one or more washing steps; and
  c) performing a cation exchange chromatography in bind-elute mode, optionally with one or more washing steps; and
  d) performing an ultrafiltration/diafiltration; and
  wherein the ultrafiltration/diafiltration of step d) is used for the formulation and adjustment of the final concentration of the Fc-peptide fusion protein; and
  wherein the ultrafiltration/diafiltration of step d) is performed in the tangential flow mode; and
  wherein the ultrafiltration/diafiltration of step d) is performed with a membrane having a nominal cut-off of about 10 kDa to 50 kDa.

EXAMPLES

The methods of the invention for purifying Fc-peptide fusion proteins are supported and illustrated by reference to the following examples. It has to be emphasized that these examples should by no means be interpreted as limiting the scope of the invention.

Example 1: Preparation of Refolded Fc-Peptide Fusion Proteins

The Fc-peptide fusion proteins were expressed in E. coli in insoluble or limited soluble form and accumulated in so-called inclusion bodies. The preparation of romiplostim was selected as an example for Fc-peptide fusion proteins. The bacteria were harvested by centrifugation and the bacterial cell sediment was inoculated in Tris-based lysis buffer. The bacteria were disrupted under pressure by passing through a homogenizer. Inclusion bodies were separated from cell debris by centrifugation and resuspended in Tris-based washing buffer and separated at the same way as before. After incubation at room temperature the washing procedure was repeated. The final sediment of inclusion bodies was stored frozen at −20° C. The frozen inclusion bodies were solubilised by classical standard procedures (Rudolph 1990) under alkali and reductive conditions with Tris-based buffer comprising Guanidine-HCl and DTT. After incubation, the solubilized inclusion bodies were redox treated in the presence of cysteine/cysteine to allow thiol-disulfide interchange during the refolding and to promote disulfide formation. The refolding was stopped by dilution with acetic acid and underwent pH-induced precipitation of impurities. The refold solution was clarified by depth filtration and microfiltration, diluted, and adjusted for pH (pH 5). The relative initial purity of refolded romiplostim as measured by RP-UPLC was about 52-62% as shown in Table 1.

TABLE 1

Relative initial purity of romiplostim in the refold solution

| Batch No. | RP-UPLC [% MP] |
|---|---|
| Batch 1 | 62.2 |
| Batch 2 | 52.2 |
| Batch 3 | 54.9 |
| Mean Value | 56.5 |

MP = main peak

Example 2: Selection of Chromatography Media

Process chromatography resins from different suppliers were tested for their efficiency as capture step, intermediate and polishing step under different modes and elution conditions. Thereby, a Protein A affinity chromatography was preferred as capture step and ion-exchange and mixed-mode chromatographies were considered for the subsequent steps. The investigation was performed in different scales with refold solutions of romiplostim obtained according Example 1. The chromatographic runs were performed with an Äkta Purifier System (GE Healthcare) at room temperature.

Special emphasis was put on the separation of the numerous product-related impurities. Table 2 shows the final selection of the chromatography resins. MabSelect SuRe LX™ gave the best results and was the selected affinity medium. Positively charged mixed-mode resins turned out to be advantageous over the commonly used anion-exchange media. Capto Adhere ImpRes™ was selected for the intermediate step. A cation exchange chromatography as final polishing step completed the sequence (FIG. 2). Many different media were compared, and the best results were obtained for the strong cation exchanger BioPro SmartSep S30™ (Table 2).

TABLE 2

Preferred chromatography media

| Process Step | Resin | Type | Ligand | Supplier |
|---|---|---|---|---|
| Capture | MabSelect SuRe LX | Affinity | Alkali-stabilized Protein A derivative | GE Healthcare |
| Intermediate | Capto Adhere ImpRes | MMC | N-Benzyl-N-methyl ethanol amine | GE Healthcare |
| Polishing | BioPro SmartSep S30 | CEX | R-SO$_3$- | YMC Europe |

MMC = mixed-mode chromatography;
CEX = cation exchange chromatography

Example 3: Protein A Affinity Chromatography with MabSelect SuRe LX

The affinity chromatography was performed with MabSelect SuRe LX (Table 2). The sample was taken after pH adjustment, dilution, and filtration of the refold solution as described in Example 1.

The column dimension was 7 cm diameter×19 cm bed height (packed volume about 730 mL). The Protein A column was equilibrated with 1.25 M urea, 150 mM ethanolamine, 200 mM L-arginine hydrochloride, pH 5.0 (3 CV). The product solution was loaded with 10-18 mg protein per mL resin. The column was washed with equilibration buffer (1.5 CV). To reduce the amount of product-related impurities such as reduced isoforms and disulfide bond isoforms, the effect of step elution and gradient elution on Protein A chromatography was compared. For step elution the buffer contained 100 mM Na-citrate and 0.5 M urea at pH 3.5. The gradient elution was performed by mixing buffer A containing 100 mM Na-citrate, 0.5 M urea at pH 5.5 and buffer B containing 100 mM Na-citrate, 0.5 M urea at pH 2.5. The decreasing linear pH gradient elution consisted of three segments: (i) 0-37% B (1 CV), (ii) 37-75% B (13.8 CV), and (iii) 75-100% B (1 CV). The flow rates were 100 cm/h. Table 3 shows the effect of pH step elution and pH gradient elution on Protein A chromatography on the reduction of product-related impurities of romiplostim. The product-related impurities were grouped according to their peaks measured by RP-UPLC into monomer variants and dimer variants of romiplostim with different open and mismatched disulfide bonds.

TABLE 3

Comparison of pH-step and pH-gradient elution on Protein A affinity chromatography for sulfide variants of romiplostim

| Elution | Sample | Mismatched Monomers RP-UPLC [%] | Mismatched Dimers RP-UPLC [%] |
|---|---|---|---|
| Step | Load | 13.7 | 10.0 |
|  | Pool | 7.5 | 8.8 |
| Gradient | Load | 11.2 | 11.0 |
|  | Pool | 0.8 | 6.7 |

Step elution resulted in a reduction of about 45% for monomer variants with open disulfide bonds and of about 12% for mismatched dimers, respectively. Surprisingly, a very high reduction of the critical monomers with open disulfides was obtained by decreasing pH gradient elution on Protein A chromatography. Open disulfide variants were decreased to about 93%. Monomers obviously showed weaker binding to Protein A than dimers and eluted before the dimers. No further effect on reduction of the already low level of open-disulfide dimerized romiplostim isoforms could be detected.

Example 3.1: Stabilizing of Protein A Eluate

To prevent precipitation, the Protein A eluate was directly collected under stirring in a stabilizing buffer. Three alternative buffers were tested: buffer 1 contained 4% D-mannitol (w/v), 2% sucrose (w/v), 20 mM L-histidine, 0.004% Tween 20, pH 5.0; buffer 2 with 20 mM NaCl, 50 mM NaCl, pH 5.0; and buffer 3 contained 100 mM Na-citrate, 0.5 M urea at pH 5.5. No precipitation was observed directly after elution for all three buffers. However, after a freeze-thaw cycle at −70° C. buffer 2 and buffer 3 showed protein precipitation of the Protein A eluate, in contrast for buffer 1 no precipitation was observed. Protein precipitation in the Protein A eluate occurred at a protein concentration >2 mg/mL. Adjusting the protein concentration of the Protein A eluate to 1.8 mg/mL to 2 mg/mL further prevented precipitation of the sample and improved storage at 2-8° C.

Example 4: Conditioning and Mixed-mode chromatography with Capto Adhere ImpRes™

After a hold step at 2-8° C., the Protein A elution pool obtained in Example 3 was prepared in a conditioning step for further purification. The capture elution pool was four times diluted with 20 mM NaH$_2$PO$_4$, pH 7 and if necessary, the pH was adjusted to pH 7.0. Alternatively, the capture elution pool was two times diluted with 100 mM sodium phosphate and if necessary, the pH was adjusted with 1 M NaOH to pH 7.0. NaCl was added to a final concentration of 25 mM. Following pH-induced precipitation the solution was incubated for 30 minutes at room temperature to allow the precipitate to settle. For clarification the solution was filtered through a 0.2 μm Supor EKV filter capsule (Pall Corporation).

Conditioning of the Protein A elution pool prior to the intermediate purification step revealed a positive effect on the reduction of monomers of romiplostim (Table 4).

TABLE 4

Reduction of monomer variants of romiplostim through conditioning and intermediate mixed-mode chromatography

| Step | Mismatched Monomers RP-UPLC [%] |
|---|---|
| Sample before MM | 1.25 |
| Sample after MM | 0.15 |

The conditioned and clarified Protein A elution pool was further purified on Capto Adhere ImpRes™ mixed-mode resin as intermediate purification step which makes use of the ligand N-benzyl- N-methyl ethanolamine (Table 2) and bears positively charged groups and provides beside anion exchanger functions hydrophobic interactions, too. The mixed-mode chromatography reduced charged variants and mismatched disulfide isoforms when performed in binding mode. The size of the packed column was 7 cm diameter ×20.5 cm bed height (packed volume about 789 mL). The resin was equilibrated in two steps consisting of (i) 500 mM $NaH_2PO_4$, pH 7 (3 CV) and (ii) 20 mM $NaH_2PO_4$ and 25 mM NaCl, pH 7 (5 CV). The adjusted and clarified Protein A elution pool was loaded onto the column with 3 mg protein per mL resin followed by equilibration buffer (1.5 CV). A pH gradient elution was performed by mixing buffer A containing 20 mM $NaH_2PO_4$, 25 mM NaCl at pH 7 and buffer B containing 20 mM NaAPC, 25 mM NaCl at pH 5 in the following ratios and sequences: (i) 0-10% B (1 CV) and (ii) 10-70% B (24 CV). Alternatively, the pH gradient elution was performed by mixing buffer A containing 20 mM $NaH_2PO_4$, 25 mM NaCl at pH 7 and buffer B containing 20 mM $NaH_2PO_4$, 25 mM NaCl at pH 5 in the following ratios and sequences: (i) 0-20% B (2 CV) and (ii) 20-70% B (16.7 CV). The flow rate was 110 cm/h.

The mixed-mode chromatography increased the relative purity from about 68% in the load to about 85% in the elution pool. For monomer variants of romiplostim with irregular open disulfide bridges a reduction of about 47% was achieved and mismatched dimer variants of romiplostim were reduced by about 58%.

Example 5: Cation exchange chromatography with BioPro Smart Sep S30™

Further separation of process-related contaminants and product-related substances such as charge variants and mismatched disulfide variants was achieved by strong cation exchange chromatography with-R-SO3-ligands (Table 2). The column was packed with BioPro SmartSep S30™ resin (YMC, Europe), 5 cm diameter ×20 cm bed height (packed volume about 392 mL) and equilibrated with 100 mM Tris adjusted with 85% mM phosphoric acid to pH 6.75 (8 CV). The solution obtained from the intermediate step as described in Example 4 was directly loaded onto the column with about 2.5-8 mg protein per mL resin. The column was washed with equilibration buffer (3 CV). The bound protein was eluted by a pH step elution at 18 mM Tris adjusted with 85% mM phosphoric acid to pH 7.6 in 40 CV. The chromatography was run at 150 cm/h. The eluate was separated in fractions to allow specific pooling. Cation exchange chromatography with pH step elution resulted in a relative purity of about 97% (main peak at RP-UPLC) with about 0.8% remaining mismatched disulfide dimers of romiplostim.

Optionally, a second BioPro SmartSep S30™ chromatography with arginine gradient elution was developed. The column was equilibrated with 20 mM Na-succinate, pH 6 (5 CV). The eluate of the first cation exchange chromatography was adjusted to pH 6 with 10% phosphoric acid, passed through a 0.2 pm EKV filter (Pall), and loaded onto the column with <5 mg permL resin. The column was washed with equilibration buffer (3 CV). The bound protein was eluted by an increasing linear gradient from 0 mM to 250 mM L-arginine in 20 mM Na-succinate, pH 6 in 49 CV. The eluate was separated into fractions to allow specific pooling. The flow rates were 150 cm/h. The column was regenerated with (i) 2 M NaCl (3 CV, 150 cm/h) and (ii) 1 M NaOH (3 CV, 40 cm/h) in reverse flow, and stored in 20 mM NaOH. This second cation exchange step under changed conditions can further deplete impurities if desired. However, for the final developed process of romiplostim, a second cation exchange step was dispensable.

Example 6: Tangential Flow Ultrafiltration/Diafiltration (TF-UF/DF)

The aim of the ultrafiltration/diafiltration step is to adjust the concentration of the protein solution and to transfer the Fc-peptide fusion protein into the final formulation buffer, which besides the buffer contains other ingredients of the final bulk formulation such as a detergents, stabilisers, salts, sugars, and/or polyols.

The TF-UF/DF step was performed using Hydrosart 30 kDa membrane (Sartorius). Transmembrane pressure of the UF/DF process was set to 0.5 bar. There was no loss of product by this step. The final bulk concentration of the Fc-peptide fusion protein was adjusted to 1 g per L. A final microfiltration (sterile filtration) was performed with a 0.2 μm Supor EKV filter capsule (Pall Corporation).

Example 7: Progress of the Relative Purity Over the Process Steps

The sequence of purification steps after refolding comprising Protein A affinity chromatography, mixed mode chromatography, and cation exchange chromatography was performed as described in the previous examples. The relative purity after each purification step of three purification runs starting with 9.5-13.5 g washed and frozen inclusion bodies is shown in FIG. 5. The relative purity which is defined as percentage of the main peak in RP-UPLC increases significantly over the whole purification process.

The purification process of three consecutive batches started with a relative purity of about 61-76% in the refold solution. This was somewhat higher as the relative initial purity of the experiments leading to Table 1. After the affinity capture chromatography with Protein A and gradient elution the relative purity increased to about 81-94%. The intermediate mixed-mode chromatography raised the relative purity to 95-96% and the final cation exchange polishing chromatography, which further removed traces only, resulted in a relative purity of about 97%.

Surprisingly, the intermediate step subsequent to the Protein A step showed high potential for removing leached protein A (Table 5). The mixed-mode chromatography significantly reduced the leached Protein A to very low levels or below the detection limit of the assay, respectively. Cation exchange chromatography as polishing step decreased the leached Protein A levels even further. Leached Protein A was measured by ELISA.

TABLE 5

Leached Protein A after capture, intermediate, and polishing step.

| Batch (Method) | Capture (ELISA) | Intermediate (ELISA) | Polishing (ELISA) |
| --- | --- | --- | --- |
| Batch 1 | 9.70 ng/mg | 0.03 ng/mg | <0.01 ng/mg |
| Batch 2 | 11.40 ng/mg | <1.04 ng/mg | <0.49 ng/mg |
| Batch 3 | 10.30 ng/mg | <1.3 ng/mg | <0.49 ng/mg |
| Batch 4 | 14.60 ng/mg | <0.87 ng/mg | <0.38 ng/mg |

Example 8: Characterization of Final Purity of Romiplostim

Table 6 reveals the final purity of three different romiplostim batches measured by four different analytical methods.

TABLE 6

Final purity of romiplostim measured by different analytical methods

| Method | SDS-PAGE Silver Stain [%] | SEC-HPLC [% MP] | CEX-HPLC [% MP] | RP-UPLC [% MP] |
| --- | --- | --- | --- | --- |
| Batch 1 | ≥98.2 | 99.9 | 99.2 | 97.0 |
| Batch 2 | ≥97.4 | 99.9 | 97.8 | 96.6 |
| Batch 3 | ≥97.9 | 99.6 | 99.3 | 97.0 |
| Mean Value | ≥97.8 | 99.8 | 98.8 | 97.0 |

MP = main peak

The SDS-Polyacrylamide gel electrophoresis (SDS-PAGE) with silver staining and densitometric evaluation revealed a relative purity (main band) of at least about 97.8%. This method can detect only a limited spectrum of impurities, such as host cell proteins and truncated forms of romiplostim. The size-exclusion (SEC)-HPLC method identifies species with different molecular sizes such as monomers and aggregates. The purity of the main peak is as high as 99.6 to 99.8%. The cation exchange (CEX) HPLC detects charge variants of romiplostim and the relative purity with this method was 97.8-99.3%. Finally, the reversed phase-ultrahigh performance chromatography (RP-UPLC) revealed a final purity of about 97%. Only traces of product-related impurities remained. As shown in Table 7, other impurities, such as host cell DNA (HC-DNA), host cell proteins (HCP), and leached Protein A are below the detection limits of the used assays or at very low levels, HCP-ELISA (<20 ppm HCP), qPCR (<0.018 ppm HCDNA), and Protein A-ELISA (0.01 ppm), respectively.

TABLE 7

Process-related impurities in the final purification stage

| Impurity (Method) | HCP (ELISA) | HCDNA (qPCR) | Leached Protein A (ELISA) |
| --- | --- | --- | --- |
| Batch 1 | <18 ng/mg | <17 pg/mg | 0.01 ng/mg |
| Batch 2 | <19 ng/mg | <18 pg/mg | <0.15 ng/mg |
| Batch 3 | <19 ng/mg | <17 pg/mg | <0.15 ng/mg |

Example 9: Characterization of Product-Related Impurities

Structural characterization of romiplostim variants using comprehensive LC-MS technology and peptide mapping of intact fusion protein, subunits, reduced and non-reduced conditions and N-terminal analysis were performed with samples of different stages of the purification process and different batches. In addition, different batches of commercially available romiplostim, which is sold under the trade name NPlate®, were analysed, too.

Besides the correctly folded and intact romiplostim, containing six disulfide bridges and the expected disulfide pattern as the main component, different variants of romiplostim with higher oxidation levels (M1, M33, M209 and W264), mismatch disulfide bonds (C7-C10 and C102-C148), free cysteines at different positions or deamidated asparagine (N96, N165) were identified as product-related impurities (Table 8).

TABLE 8

Identified product-related impurities of romiplostim

| Detected variant | Position |
| --- | --- |
| Methionine Oxidation | M1, M33, M209 |
| Tryptophane Oxidation | W264 |
| Deamidation (Asparagine) | N96, N165 |
| Reduced forms, free Cysteine | Not localised |
| Disulfide mismatches | C7-C10, C102-C148 |
| Truncation | C-terminal, N-terminal |
| Carbamylation | Not localised |
| α-N-Gluconoyl variant | Not localised |

The reduced and oxidized variants of romiplostim were further characterized according to their peak position by RP-UPLC (Table 8). Different variants such as monomers with two to four open disulfide bonds, trimers, tetramers, and oxidized species of romiplostim are represented by an RRT<1.0. Dimers of romiplostim with either one or two mismatched disulfide bridges were identified by an RRT>1.0 (Table 9).

TABLE 9

Peak assessment of reduced and oxidized variants of romiplostim in RP-UPLC

| Peak Position (RRT) | Variant |
| --- | --- |
| 0.791 | Monomer, 2 × SS open |
| 0.830 | Tetramer |
| 0.885 | Monomer, 3 × SS open |
| 0.890 | Trimer |
| 0.950 | Monomer, 4 × SS open |
| 0.986 | Oxidized species |
| 1.048 | Dimer, 1 × SS open |
| 1.067 | Dimer, 2 × SS open |

These product-related impurities of Table 7 and 8 were only detected in traces in the final purification stage and in NPlate® as well.

LIST OF REFERENCES

1. Cwirla S E, Balasubramanian P, Duffin D J, Wagstrom C R, Gates C M, Singer S C, Davis A M, Tansik R L, Mattheakis L C, Boytos C M, Schatz P J, Baccanari D P, Wrighton N C, Barrett R W, Dower W J (1997) Peptide agonist of the thrombopoietin receptor as potent as the natural cytokine. Science 276(5319): 1696-1699
2. Dietrich A, Rudolph R, Schaffner J. (2003) Industrial Protein Folding. BIOforum Europe GIT Verlag GmbH & Co. KG Darmstadt 1-3
3. Fahrner R L, Knudsen H L, Basey C D, Galan W, Feuerhelm D, Anderlaan M V, Blank G S (2001) Industrial Purification of Pharmaceutical Antibodies: Development, Operation, and Validation of Chromatography Processes. Biotechnol. Genet. Eng. Rev. 18: 301-327
4. Fayaz S, Fard-Esfahani P, Golkar M, Allahyari M, Sadegh S (2016) Expression, purification and biological activity assessment of romiplostim biosimilar peptibody. Daru 24: 18
5. Gagnon P (1996) Purification Tools for Monoclonal Antibodies. Validated Biosystems 1-253
6. GE Healthcare (2007) Purification and renaturation of recombinant proteins produced in Escherichia coli as inclusion bodies. Application Note 18-1112-33, 1-4
7. Li J, Yang C, Xia Y, Bertino A, Glaspy J, Roberts M, Kuter D J (2001) Thrombocytopenia caused by the development of antibodies to thrombopoietin. Blood 8(12): 3241-3248
8. Linderholm A L and Chamow S M (2014) Immunoglobulin Fc-Fusion Proteins. BioProcess International 12(9): 30-35
9. Liu H F (2010) Recovery and purification process development for monoclonal antibody production. mAbs 2(5): 480-499
10. Marston F A O (1986) The purification of eukaryotic polypeptides synthesized in Escherichia coli. Biochem. J. 240: 1-12
11. Pyzik M, Rath T, Lencer W I, Baker K, Blumberg R S (2015) FcRn: The Architect Behind the Immune and Nonimmune Functions of IgG and Albumin. J Immunol 194(10): 4595-4603
12. Rudolph R (1990) Renaturation of recombinant, disulfide-bonded proteins from "inclusion bodies". In Modern Methods in Protein- and Nucleic Acid Research, Walter de Gryter, New York 149-171
13. Rudolph R and Lilie H (1996) In vitro folding of inclusion body proteins. FASEB J 10: 49-56
14. Shimamoto G, Gegg C, Boone T, Quéva C (2012) Peptibodies—A flexible alternative format to antibodies. mAbs 4(5): 586-591
15. Shukla A A, Jiang C, Ma J, Rubacha M, Flensburg L, Lee S S (2008) Demonstration of robust host cell protein clearance in biopharmaceutical downstream processes. Biotechnol. Prog. 24, 615-622
16. Zhang L, Jiang C, Chen X, Gu J, Song Q, Zhong H, Xiong S, Qingfeng Dong Q, Yu J, Deng N (2020) Large-scale production, purification, and function of a tumor multi-epitope vaccine: Peptibody with bFGF/VEGFA. Eng Life Sci. 20, 422-436
17. EP0219874
18. WO0002901
19. WO0024770
20. WO0024782
21. WO2010151688
22. WO2011005488
23. WO2017168296

The invention claimed is:

1. A method for purification of a refolded Fc-peptide fusion protein from a refold solution comprising the Fc-peptide fusion protein and at least one impurity, wherein the refold solution has been subjected to a step of adaption, the method comprising the following steps in the following order:
   a) performing an affinity capture chromatography in bind-elute mode;
   b) performing a mixed-mode chromatography in bind-elute mode;
   c) performing a cation exchange chromatography in bind-elute mode; and
   d) performing an ultrafiltration/diafiltration;
   wherein step b) is performed with a positively charged mixed-mode chromatography medium and wherein the mixed-mode chromatography of step b) is preceded by a conditioning step, wherein the conditioning step comprises dilution, pH adjustment, incubation, and filtration of the eluate of the affinity capture chromatography of step a).

2. The method according to claim 1, wherein the at least one impurity is a sulfide variant of the Fc-peptide fusion protein.

3. The method according to claim 1, wherein the Fc-peptide fusion protein is eluted from the affinity chromatography medium of step a) with a decreasing linear pH gradient.

4. The method of claim 3, wherein the pH gradient starts at about pH 5.5 and ends at about pH 2.5.

5. The method of claim 1, wherein step a) is performed with a Protein A chromatography medium.

6. The method of claim 5, wherein the Protein A chromatography medium comprises as a ligand an alkali-stabilized tetramer variant of domain B of Protein A bound to a cross-linked agarose matrix.

7. The method of claim 5, wherein at least one of the wash and the elution buffer used in the Protein A chromatography of step a) includes urea.

8. The method of claim 7, wherein the wash buffer and the elution buffer used in the Protein A chromatography of step a) include urea.

9. The method of claim 5, wherein in step a) the eluate of the Protein A capture chromatography is collected in a stabilizing buffer, wherein the stabilizing buffer comprises D-mannitol, sucrose, L-histidine, and polysorbate 20.

10. The method of claim 9, wherein the pH of the stabilizing buffer of step a) is in the range of 3.5 to 6.5.

11. The method of claim 1, wherein the Fc-peptide fusion protein is eluted from the positively charged mixed-mode chromatography medium of step b) with a decreasing pH gradient.

12. The method of claim 11, wherein the pH gradient is formed by mixing of two buffers having pH values of about pH 5 and about pH 7.

13. The method of claim 1, wherein the positively charged mixed-mode chromatography medium comprises N-benzyl-N-methyl ethanolamine as a ligand bound to a cross-linked agarose matrix.

14. The method according to claim 1, wherein step c) is performed with a cation exchange medium, wherein the Fc-peptide fusion protein is eluted from the cation exchange medium by an increase in the pH.

15. The method of claim 1, wherein step d) results in a formulated pharmaceutical composition or a pre-stage pharmaceutical composition.

16. The method of claim 15, wherein the formulated pharmaceutical composition or pre-stage pharmaceutical composition comprises the purified Fc-peptide fusion protein, water, a buffer, and at least one further compound selected from a detergent, a stabiliser, a salt, a sugar, and a polyol.

17. The method of claim 15, wherein the pharmaceutical composition is a lyophilisate.

18. The method of claim 1, wherein the Fc-peptide fusion protein is a monomer or a dimer.

19. The method of claim 1, wherein the refolded Fc-peptide fusion protein is non-glycosylated.

20. The method of claim 1, wherein the refolded Fc-peptide fusion protein is a receptor agonist.

21. A method for producing of a refolded Fc-peptide fusion protein, the method comprising the following steps in the following order:
1) Expression of an Fc-peptide fusion protein in microorganisms wherein the Fc-peptide fusion protein is present in inclusion bodies;
2) Lysis of the microorganisms;
3) Sedimentation of the inclusion bodies;
4) Solubilization of the inclusion bodies;
5) Refolding of the Fc-peptide fusion protein present in the inclusion bodies;
6) Adaption of the refold solution containing the refolded Fc-peptide fusion protein;
7) Purification of the Fc-peptide fusion protein comprising the following steps in the following order:
   a) performing an affinity capture chromatography in bind-elute mode;
   b) performing a mixed-mode chromatography;
   c) performing a cation exchange chromatography; and
   d) performing an ultrafiltration/diafiltration;
wherein the chromatographies a), b), and c) are performed in bind-elute mode,
and wherein step b) is performed with a positively charged mixed-mode chromatography medium and wherein the mixed-mode chromatography of step b) is preceded by a conditioning step, wherein the conditioning step comprises dilution, pH adjustment, incubation, and filtration of the eluate of the affinity capture chromatography of step a).

22. The method of claim 21, comprising a step of formulating the purified Fc-peptide fusion protein into a pharmaceutical composition.

23. The method according to claim 1, wherein the chromatographies a), b), and c) are performed with one or more washing steps.

24. The method of claim 20, wherein the receptor agonist is a thrombopoietin mimetic.

25. The method of claim 24, wherein the thrombopoietin mimetic is romiplostim.

* * * * *

SEQUENCE LISTING

```
<160> NUMBER OF SEQ ID NOS: 1

<210> SEQ ID NO 1
<211> LENGTH: 269
<212> TYPE: PRT
<213> ORGANISM: Artificial Sequence
<220> FEATURE:
<223> OTHER INFORMATION: monomer chain of Fc-peptide fusion protein
      romiplostim

<400> SEQUENCE: 1

Met Asp Lys Thr His Thr Cys Pro Pro Cys Pro Ala Pro Glu Leu Leu
1               5                   10                  15

Gly Gly Pro Ser Val Phe Leu Phe Pro Pro Lys Pro Lys Asp Thr Leu
            20                  25                  30

Met Ile Ser Arg Thr Pro Glu Val Thr Cys Val Val Val Asp Val Ser
        35                  40                  45

His Glu Asp Pro Glu Val Lys Phe Asn Trp Tyr Val Asp Gly Val Glu
    50                  55                  60

Val His Asn Ala Lys Thr Lys Pro Arg Glu Glu Gln Tyr Asn Ser Thr
65                  70                  75                  80

Tyr Arg Val Val Ser Val Leu Thr Val Leu His Gln Asp Trp Leu Asn
                85                  90                  95

Gly Lys Glu Tyr Lys Cys Lys Val Ser Asn Lys Ala Leu Pro Ala Pro
            100                 105                 110
```

-continued

```
Ile Glu Lys Thr Ile Ser Lys Ala Lys Gly Gln Pro Arg Glu Pro Gln
        115                 120                 125

Val Tyr Thr Leu Pro Pro Ser Arg Asp Glu Leu Thr Lys Asn Gln Val
        130                 135                 140

Ser Leu Thr Cys Leu Val Lys Gly Phe Tyr Pro Ser Asp Ile Ala Val
145                 150                 155                 160

Glu Trp Glu Ser Asn Gly Gln Pro Glu Asn Asn Tyr Lys Thr Thr Pro
                165                 170                 175

Pro Val Leu Asp Ser Asp Gly Ser Phe Phe Leu Tyr Ser Lys Leu Thr
            180                 185                 190

Val Asp Lys Ser Arg Trp Gln Gln Gly Asn Val Phe Ser Cys Ser Val
        195                 200                 205

Met His Glu Ala Leu His Asn His Tyr Thr Gln Lys Ser Leu Ser Leu
        210                 215                 220

Ser Pro Gly Lys Gly Gly Gly Gly Ile Glu Gly Pro Thr Leu Arg
225                 230                 235                 240

Gln Trp Leu Ala Ala Arg Ala Gly Gly Gly Gly Gly Gly Gly Ile
                245                 250                 255

Glu Gly Pro Thr Leu Arg Gln Trp Leu Ala Ala Arg Ala
            260                 265
```